United States Patent
Prabhakar et al.

(10) Patent No.: US 11,758,420 B2
(45) Date of Patent: Sep. 12, 2023

(54) SMART MECHANISM TO MANAGE THERMAL IMPACT IN 5G NR

(71) Applicant: Apple Inc., Cupertino, CA (US)

(72) Inventors: Alosious Pradeep Prabhakar, Singapore (SG); Wen Zhao, San Jose, CA (US); Lakshmi N. Kavuri, Cupertino, CA (US); Li Su, San Jose, CA (US); Sagar B. Shah, San Jose, CA (US); Sriram Subramanian, Santa Clara, CA (US); Vijay Venkataraman, San Jose, CA (US); Vishwanth Kamala Govindaraju, Mountain View, CA (US); Shiva Krishna Narra, San Jose, CA (US); Sanjeevi Balasubramanian, San Jose, CA (US); Wei Zhang, Santa Clara, CA (US); Madhukar K. Shanbhag, Santa Clara, CA (US); Sandeep K. Sunkesala, San Jose, CA (US); Srinivasan Nimmala, San Jose, CA (US); Muthukumaran Dhanapal, Dublin, CA (US); Tarakkumar G. Dhanani, San Jose, CA (US); Sree Ram Kodali, Sunnyvale, CA (US); Ioannis Pefkianakis, San Jose, CA (US); Dhruv Khati, San Jose, CA (US); Franco Travostino, San Jose, CA (US); Thanigaivelu Elangovan, Santa Clara, CA (US); Madhusudan Chaudhary, Campbell, CA (US); Geoffrey R. Hall, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/888,989

(22) Filed: Aug. 16, 2022

(65) Prior Publication Data
US 2022/0394513 A1 Dec. 8, 2022

Related U.S. Application Data

(62) Division of application No. 16/952,906, filed on Nov. 19, 2020, now Pat. No. 11,558,758.

(Continued)

(51) Int. Cl.
*H04W 24/02* (2009.01)
*H04W 76/15* (2018.01)
(Continued)

(52) U.S. Cl.
CPC ........... *H04W 24/02* (2013.01); *H04W 52/28* (2013.01); *H04W 76/15* (2018.02); *H04W 76/23* (2018.02); *H04W 76/27* (2018.02); *H04W 76/30* (2018.02)

(58) Field of Classification Search
CPC .............................. H04W 24/02; H04W 76/15
See application file for complete search history.

(56) References Cited

U.S. PATENT DOCUMENTS 10,129,796 B2 11/2018 Ekici et al.
10,470,074 B2 11/2019 Kashyap et al.
(Continued)

FOREIGN PATENT DOCUMENTS

JP 2014-036338 2/2014
WO 2017197103 A1 11/2017

OTHER PUBLICATIONS

Partial International Search Report for PCT/US2020/065007, dated Apr. 12, 2021.

(Continued)

*Primary Examiner* — Sulaiman Nooristany
(74) *Attorney, Agent, or Firm* — Kowert, Hood, Munyon, Rankin & Goetzel, P.C.

(57) ABSTRACT

This disclosure relates to methods and devices for mitigating overheating in a user equipment device (UE). The UE is (Continued)

configured to communicate over each of LTE and 5G NR and may be configured to communicate through 5G NR over each of a Sub-6GHz and a millimeter Wave (mmW) frequency band. The UE is configured to establish an ENDC connection with an eNB and one or more gNBs. The UE implements intelligent transmission modification and cell measurement adjustments to mitigate overheating and reduce battery drain.

14 Claims, 20 Drawing Sheets

Related U.S. Application Data

(60) Provisional application No. 62/951,232, filed on Dec. 20, 2019.

(51) Int. Cl.
*H04W 52/28* (2009.01)
*H04W 76/23* (2018.01)
*H04W 76/27* (2018.01)
*H04W 76/30* (2018.01)

(56) References Cited

U.S. PATENT DOCUMENTS

| | | |
|---|---|---|
| 2010/0091747 A1 | 4/2010 | Dorsey et al. |
| 2014/0199952 A1 | 7/2014 | Sandhu et al. |
| 2016/0315680 A1 | 10/2016 | Braun et al. |
| 2019/0069304 A1 | 2/2019 | Chang et al. |
| 2019/0268950 A1* | 8/2019 | Youtz .................. H04W 76/30 |
| 2020/0351746 A1 | 11/2020 | Jia |

OTHER PUBLICATIONS

Office Action JP Patent Application No. 2022-531471; dated May 11, 2023.

* cited by examiner

Low Thermal Mitigation

Time in Backoff Mode <
Time in No Backoff Mode

Normal Thermal Mitigation

Time in Backoff Mode =
Time in No Backoff Mode

High Thermal Mitigation

Time in Backoff Mode >
Time in No Backoff Mode

SMART MECHANISM TO MANAGE THERMAL IMPACT IN 5G NR

PRIORITY CLAIM

This application is a divisional of U.S. patent application Ser. No. 16/952,906, titled "Smart Mechanism to Manage Thermal Impact in 5G NR" and filed on Nov. 19, 2020, which claims priority to U.S. Provisional Patent Application No. 62/951,232, titled "Smart Mechanism to Manage Thermal Impact in 5G NR" and filed on Dec. 20, 2019, which are both hereby incorporated by reference in their entirety, as though fully and completely set forth herein.

TECHNICAL FIELD

The present application relates to wireless communication, including methods, systems, and apparatuses to mitigate overheating in a dual-radio access technology wireless device.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. For example, the design of wireless networks may increasingly include carrier aggregation (CA). During a CA communication session, a wireless device may be in communication with each of a primary cell (PCell) and one or more secondary cells (SCells). The introduction of multiple active cells, and in particular cells that operate at higher frequency such as millimeter wave (mmW) cells, may increase the risk of overheating for the wireless device. Therefore, improvements in the field are desired.

SUMMARY

Embodiments are presented herein of, inter alfa, systems, apparatuses, and methods for mitigating overheating in a wireless device configured to communicate over both Long Term Evolution (LTE) and 5$^{th}$ Generation New Radio (5G NR) in a carrier aggregation scenario.

In some embodiments, a user equipment device (UE) establishes a connection with a primary cell (PCell) and one or more secondary cells (SCells). The primary cell may be an LTE eNB, and the one or more secondary cells may be 5G NR gNB(s). The SCells may operate according to either a Sub-6 GHz (Sub6) or a mmWave (mmW) frequency range. Prolonged transmissions by the UE over the mmW frequency range may lead to overheating of the UE, and various embodiments herein describe methods and devices to mitigate overheating in a 5G-capable device.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
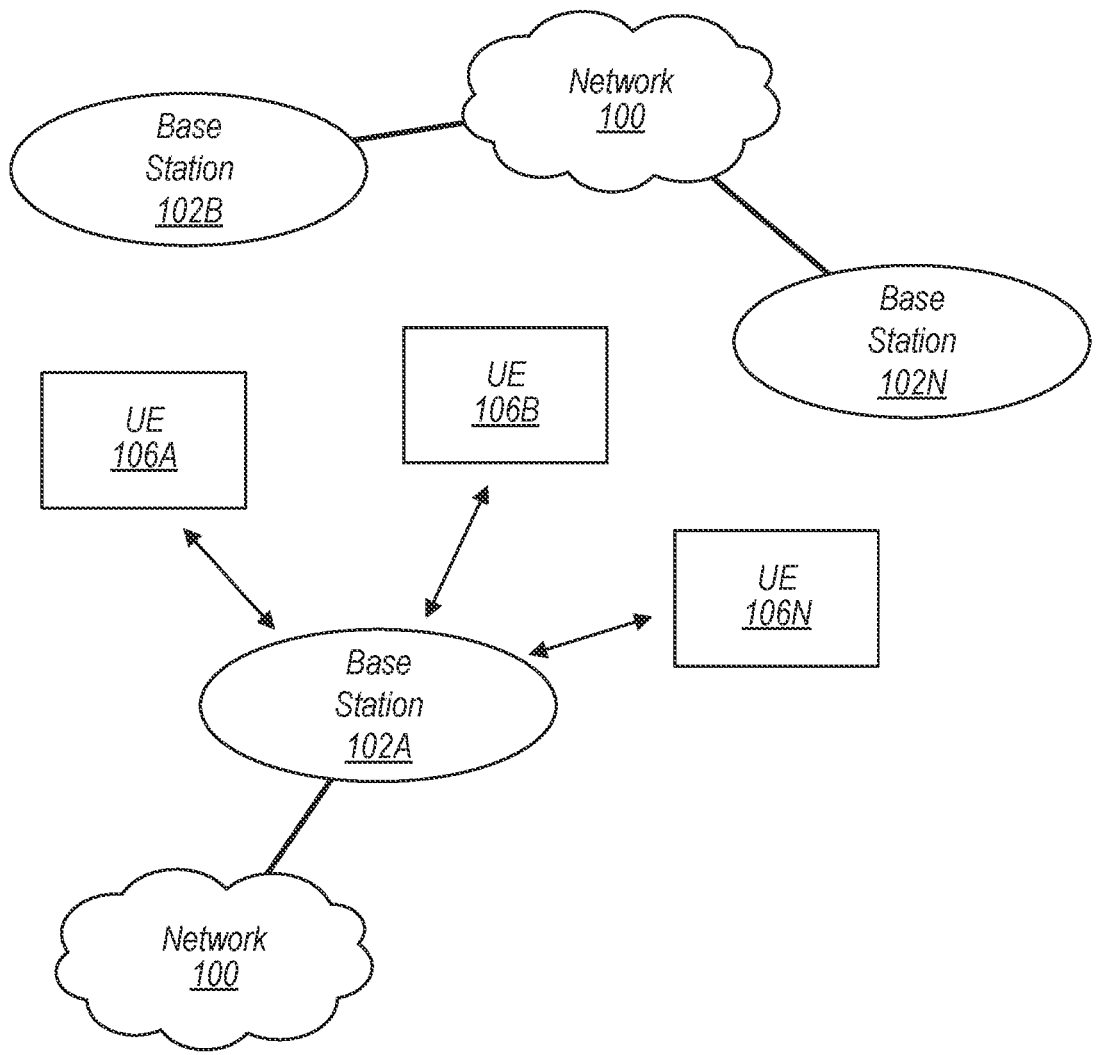
FIG. 1 illustrates an exemplary (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
RAN: Radio Access Network
GSM: Global System for Mobile Communications
UMTS: Universal Mobile Telecommunications System
UTRAN: UMTS Terrestrial Radio Access Network or Universal Terrestrial Radio Access Network
UE: User Equipment
LTE: Long Term Evolution
NR: New Radio
E-UTRAN: Evolved UMTS Radio Access Network or Evolved Universal Radio Access Network
RRC: Radio Resource Control
RLC: Radio Link Control
MAC: Media Access Control
PDCP: Packet Data Convergence Protocol
RF: radio frequency
DL: downlink
UL: uplink
NW: Network
BS: base station
MME: Mobility Management Entity
AMF: Access Management Function
AS: access stratum
NAS: non-access stratum
RAT: radio access technology
PLMN: public land mobile network
LAA: licensed assisted access
CA: carrier aggregation
Rx: receiver
PDCCH: physical downlink control channel
PDSCH: physical downlink shared channel
PRB: physical resource block
DCI: downlink control information
SNR: signal-noise ratio
RSRP: reference signal received power
SF: subframe Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™ Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
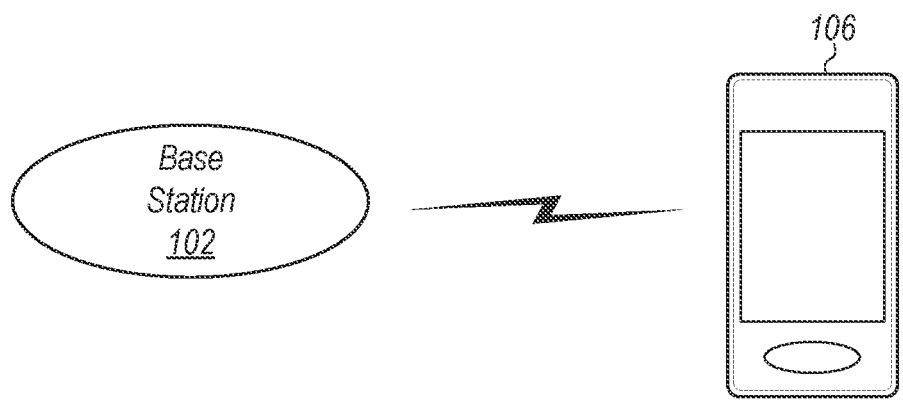
FIG. 2 illustrates a base station (BS) in communication with a user equipment (UE) device, according to some embodiments.

FIGS. 1-2—Communication System

FIG. 1 illustrates an exemplary (and simplified) wireless communication system in which aspects of this disclosure may be implemented, according to some embodiments. For example, any or all of the wireless devices illustrated in FIG. 1 may be configured for performing signal detection as described herein, e.g., according to one or more of the methods described herein. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware and/or software that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication among the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 5G NR, 3GPP2 CDMA2000 (e.g., 1xRTT, 1xEV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, 5G NR, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, UMTS, LTE, LTE-A, NR, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for multiple input multiple output (MIMO) communications) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1xRTT (or LTE or GSM), and separate radios for communicating using each of Wi-Fi and Bluetooth. Other configurations are also possible.

The UE 106 and/or BS 102 may be configured to perform carrier aggregation (CA). For example, the BS 102 may use carriers using any combination of RATs to communicate with UE 106. As one possibility, the UE 106 and BS 102 may employ licensed assisted access (LAA) techniques, and may thus aggregate licensed and unlicensed spectrum for communication. Carrier aggregation may employ a primary cell (PCell) and one or more secondary cells (SCells), which may be collocated within a single base station tower, or may be distributed over a first BS and one or more neighboring BSs, according to various embodiments.

Figure 3:
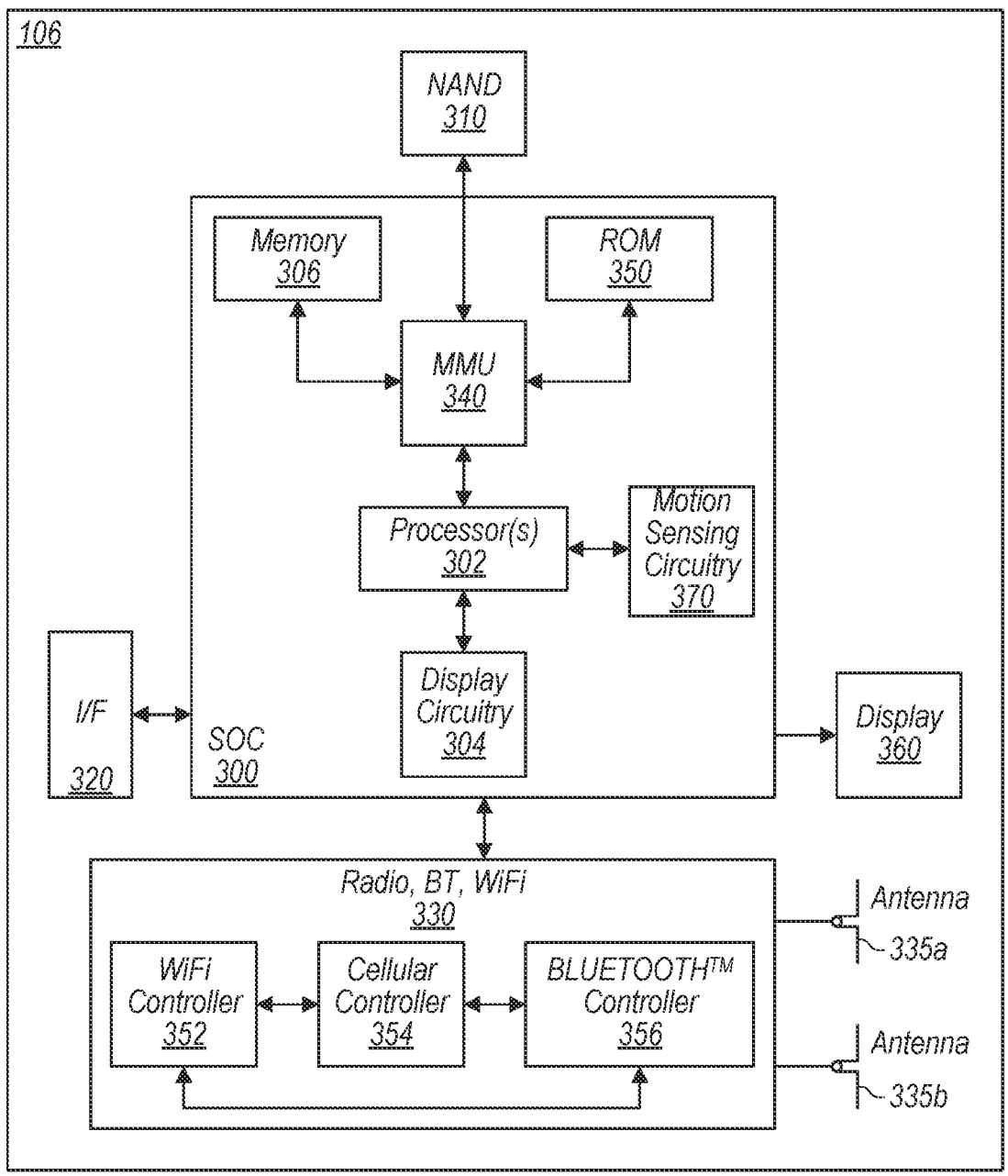
FIG. 3 illustrates an exemplary block diagram of a UE, according to some embodiments.

FIG. 3—Block Diagram of a UE Device

FIG. 3 illustrates one possible block diagram of a UE device 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106 may include at least one antenna, and in some embodiments multiple antennas 335a and 335b (and/or further additional antennas), for performing wireless communication with base stations and/or other devices. For example, the UE device 106 may use antennas 335a and 335b to perform the wireless communication. As noted above, the UE device 106 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106 to perform Wi-Fi communications on an 802.11 network. The Bluetooth Logic 336 is for enabling the UE device 106 to perform Bluetooth communications. The cellular modem 334 may be a lower power cellular modem capable of performing cellular communication according to one or more cellular communication technologies (e.g., LTE, 5G NR, GSM, etc.).

As described herein, UE 106 may include hardware and software components for implementing embodiments of this disclosure. For example, one or more components of the wireless communication circuitry 330 (e.g., cellular modem 334) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
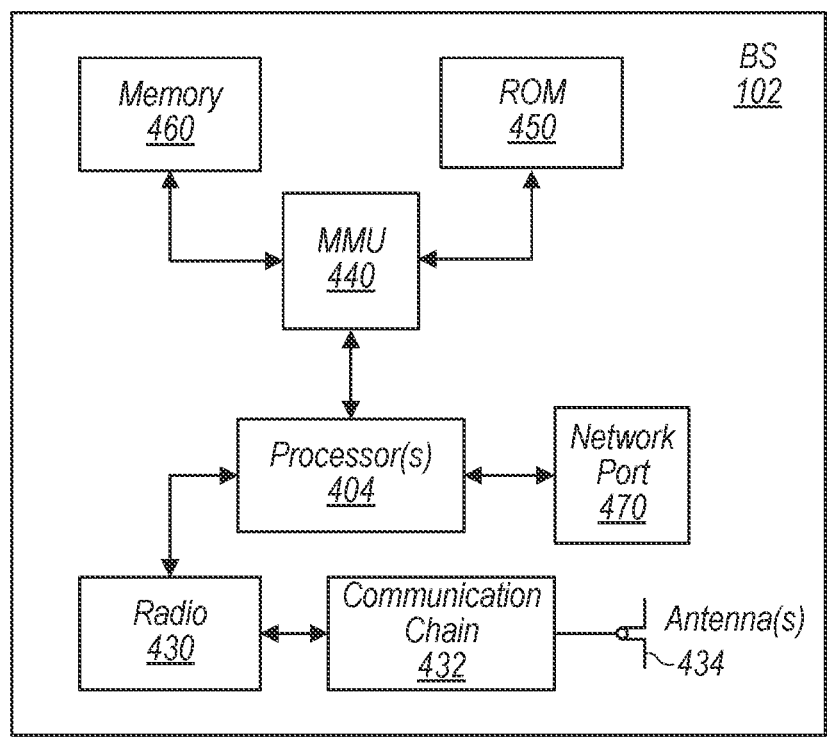
FIG. 4 illustrates an exemplary block diagram of a BS, according to some embodiments.

FIG. 4—Block Diagram of a Base Station (BS)

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430 (or multiple radios 430). The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, LTE and 5G NR, UMTS and GSM, etc.). The BS 102 may provide one or more cells of one or more communication technologies and/or one or more public land mobile networks (PLMNs). The BS 102 may provide multiple cells which may be organized, grouped, or configured as one or more cell sets, according to some embodiments. One or more cell sets that are provided by BS 102 may also include cells provided by one or more additional base stations, according to some embodiments.

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein. The BS 102 may be configured to perform carrier aggregation (CA).

The BS 102 may be an eNodeB (eNB) or gNodeB (gNB), according to various embodiments.

Figure 5A:
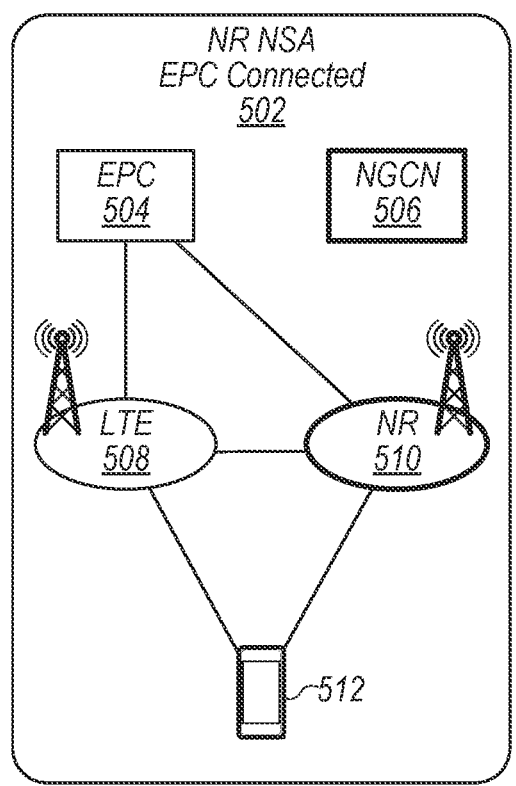
FIGS. 5A-B are schematic diagrams of a non-standalone (NSA) and a standalone (SA) communication configuration, according to some embodiments.
Figure 5B:
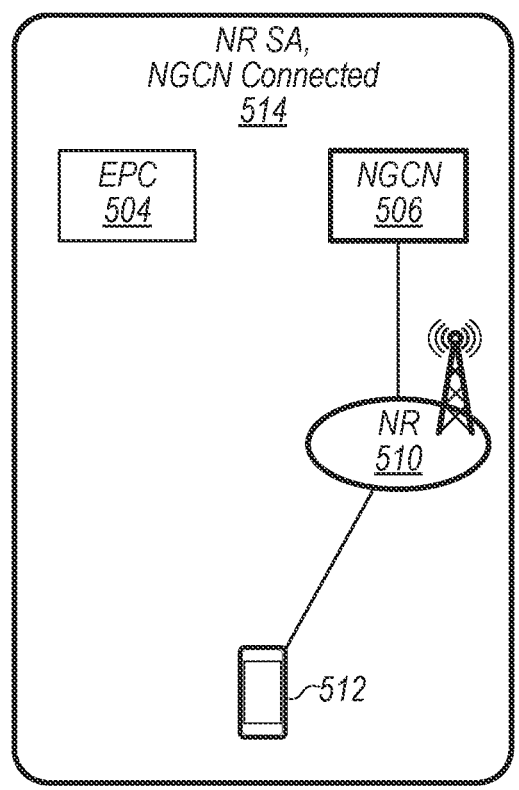

FIGS. 5A-B—ENDC and Standalone Deployments

In some embodiments, a UE device may operate in an area with an Evolved Universal Terrestrial Radio Access (EUTRA) New Radio (NR) Dual Connectivity (ENDC) deployment, where the UE is connected to both a NR gNB in a non-standalone (NSA) deployment and an LTE eNB, and wherein both the gNB and the eNB are connected to an evolved packet core (EPC), as illustrated in FIG. 5A. Alternatively, the UE device may operate in an area with NR standalone (SA) deployment as illustrated in FIG. 5B, where the UE is connected to a next generation converged network (NGCN) via the gNB. Embodiments herein describe various methods and devices to mitigate thermal impact, extend battery lifetime, and achieve other benefits in these and other environments.

Carrier Aggregation

5G New Radio (NR) and LTE, as well as other wireless networks, may include carrier aggregation (CA), enabling a user equipment device (UE) such as the UE 106 to communicate with multiple cells on separate bandwidths to increase overall throughput. CA techniques may allow for increased throughput or performance by efficiently using the spectrum/frequency resources available to a network.

In general, a UE may establish a connection with the network through a primary cell (PCell), and may subsequently establish a secondary connection with one or more secondary cells (SCells) to increase throughput. The PCell and the one or more SCells may be collocated, or they may be instantiated as separate base stations, according to various embodiments. The PCell and the one or more SCells may operate according to the same RAT (e.g., 5G NR) or different RATs (e.g., LTE and 5G NR), according to various embodiments. In exemplary embodiments, the PCell is an LTE cell (such as an eNB) called the Master Cell Group (MCG) which acts as an anchor cell and on which initial signaling is established, while the SCell is a 5G NR cell (such as a gNB) called the Secondary Cell Group (SCG). The 5G SCell may be added subsequent to the UE attaching to the PCell, either blindly or based on the UE's 5G cell measurements. Data may be then transferred depending on the configuration over 5G cell. This configuration may be referred to as a Non-Standalone (NSA) configuration with an LTE anchor, and is illustrated schematically in FIG. 5A.

Different UEs may have different capabilities with regard to CA. For example, some UEs may be able to perform CA with certain combinations of frequency ranges, but not with other combinations of frequency ranges. Similarly, different cells, different regions, or different networks may use various combinations of frequency ranges for CA. For example, a given PLMN may have licenses to use different frequency ranges in one region than another.

5G New Radio (5G NR) is designed to support diverse use cases requiring Ultra Reliable Low Latency (URLLC—round trip latency tolerance of 1 ms), Enhanced Mobile Broadband (eMBB—downlink throughputs of around 20 Gbps), and Massive internet-of-things (MIOT—supporting thousands of devices in a cell), among other possibilities.

In some implementations, a sub-6 Ghz frequency range (Sub6) (i.e., a frequency range below 6 GHz) as well as a mmWave frequency range (mmW) may be deployed by one or more gNBs. For the mmW deployment, the bandwidth may be much larger than for the sub-6 GHz frequency range (e.g., the mmW bandwidth may be 50 MHz, 100 Mhz, 200 Mhz, or 400 Mhz, among other possibilities). The Sub6 range is sometimes referred to as "FR1", while the mmW range is sometimes referred to as "FR2". In some embodiments, a UE may need to utilize special radio frequency (RF) modules in order to be able to scan and/or measure these wider bandwidths, which may consume more power than scanning and/or measurements performed over LTE or over Sub6. Accordingly, battery usage may be increased when 5G mmW is in use. Additionally, for beam management, as more elements in these RF modules are active, power consumption may be higher.

It is expected that field deployments for NR for both Sub6 and mmW frequencies may have overlapping coverage. In these embodiments, it may be desirable for the UE to conserve battery power if it is below a certain threshold of remaining battery life, and intelligently take measurement reporting decisions that may trigger NR cell addition by the network.

For a non-standalone (NSA) ENDC deployment, as thermal heat increases in the device during an active data session, some embodiments herein describe measure that may be taken to control the heat to avoid brown out conditions. In previously implemented radio access technologies (RATs), an active session may only involve one technology such as LTE or WCDMA. In contrast, ENDC deployments may involve simultaneous use of both LTE and 5G modems of a UE that are active for a single data session. Accordingly, it may be desirable to evaluate the data on each technology and make intelligent decisions to identify where and when modem power may be backed off to mitigate heating without adversely affecting the data session or the user experience.

Back-Off Mode

Figure 6:
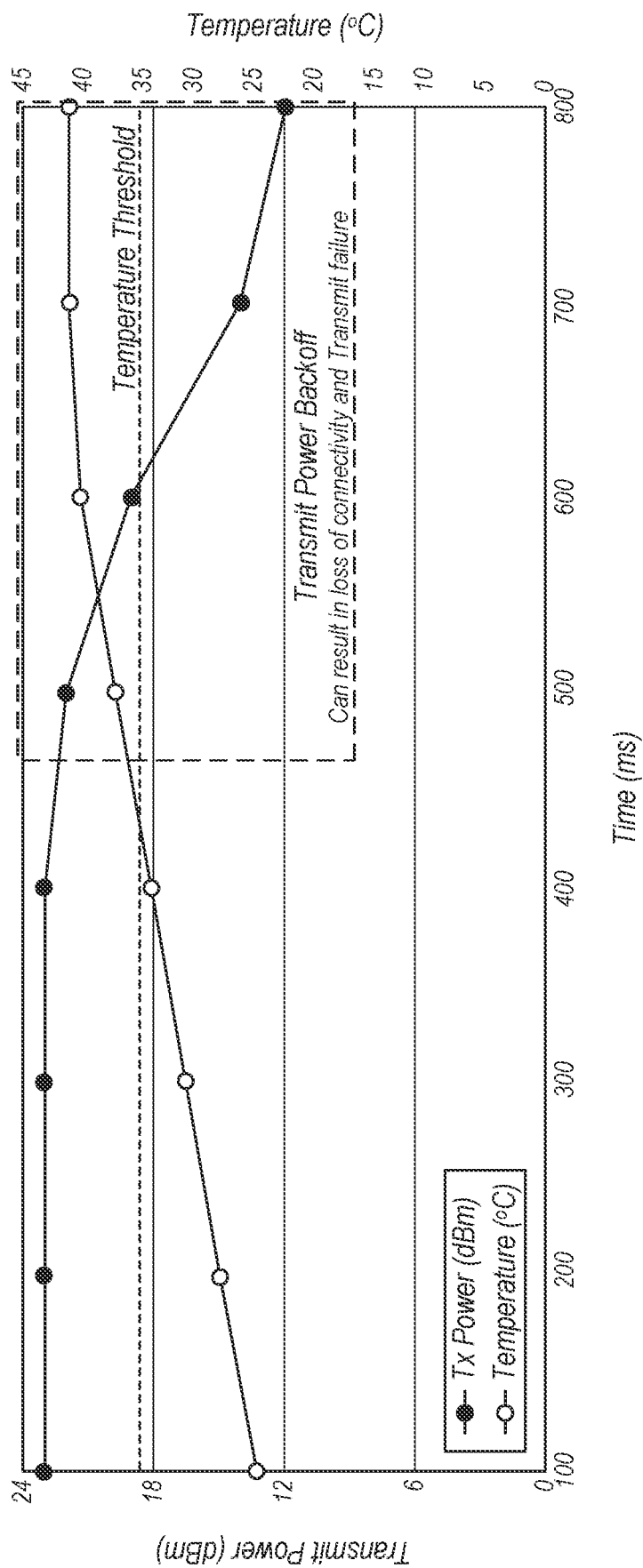
FIG. 6 illustrates an example graph of temperature of a UE over time superimposed on transmit power, according to some embodiments.

In some embodiments, when a UE's temperature exceeds a certain threshold, one or more precautionary measures may be taken to mitigate the increased temperature and prevent damage to the device. For example, in some embodiments, a transmit power back-off may be implemented, which reduces the transmit power of cellular technologies compared to normal mode operation. However, if the UE is in limited link budget conditions, lower transmit power may result in loss of connectivity or transmit failures. For example, FIG. 6 illustrates an example graph of temperature of a UE over time superimposed on transmit power, according to some existing implementations. As illustrated, when the temperature crosses a temperature threshold, transmit power back-off is implemented to reduce the transmit power and mitigate the temperature increase. However, the implementation shown in FIG. 6 may result in loss of connectivity and/or a transmit failure. Embodiments herein propose implementing periodic back-off mode to achieve the desired temperature reduction with a smaller risk of connectivity loss and transmit failures.

Figure 7:
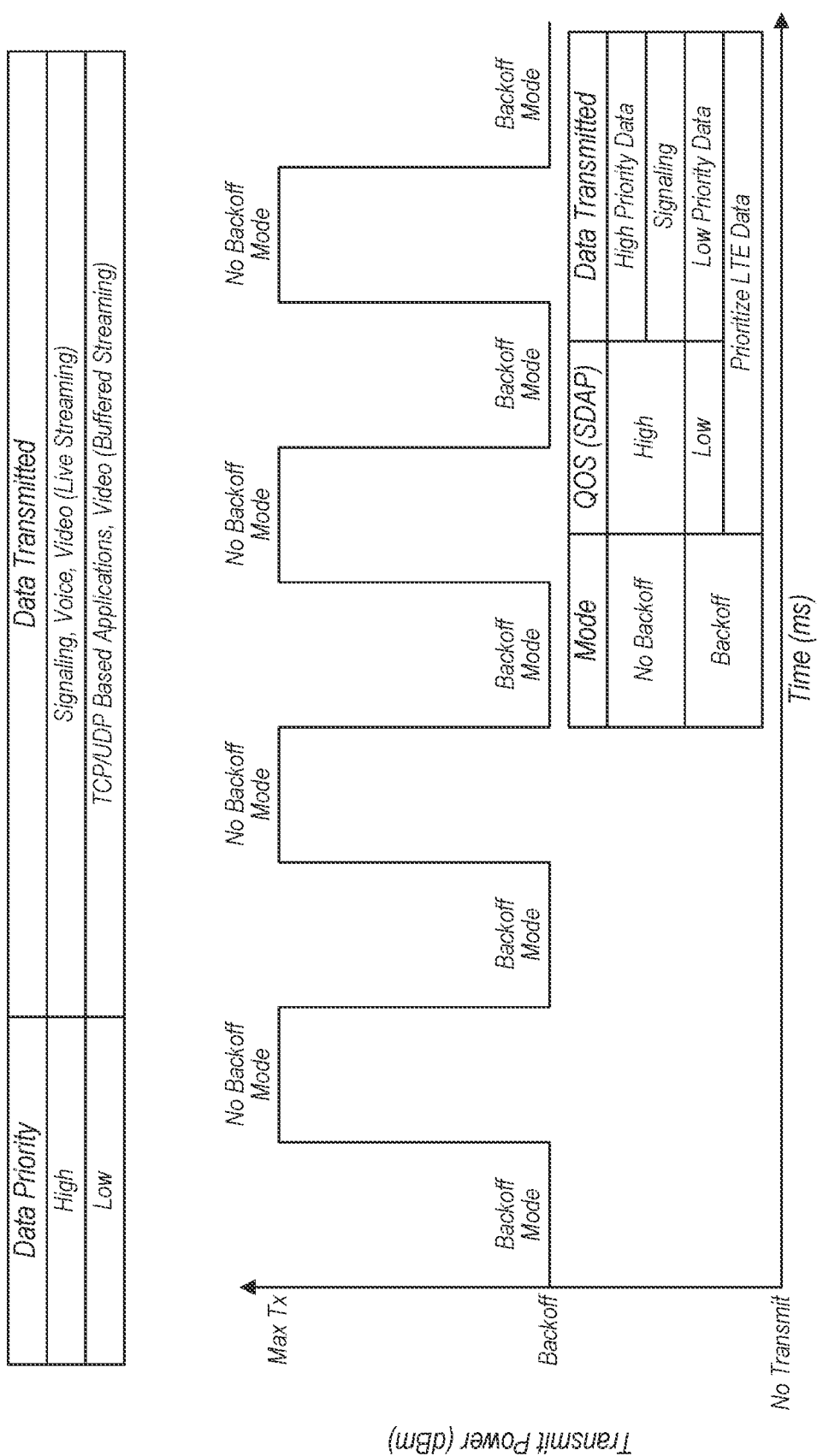
FIG. 7 illustrates a transmit power duty cycle implementing back-off mode, according to some embodiments.

For example, in some embodiments a transmit power duty cycle is introduced to periodically switch between normal mode and back-off mode, as shown in FIG. 7. As illustrated, a UE may periodically alternate between transmitting at maximum transmit power and transmitting at a reduced transmit power.

In some embodiments, in normal mode, the UE may transmit at maximum power to ensure that link is functional for high priority data and signaling is maintained. Conversely, during back-off mode the UE may transmit at a lower transmit power and transmit lower priority data. In other words, the UE may preferentially transmit high priority data and signaling during periods of normal mode operation, and the UE may preferentially transmit lower priority data during back-off mode operation. Advantageously, periodic operation in normal mode may provide high transmission power for high priority data and signaling to prevent loss of connectivity, while still experiencing the thermal mitigation of back-off mode. In some embodiments the desired quality of service (QoS) of data (e.g., high or low priority) may be handled by a service data adaptation protocol (SDAP).

Figure 8:
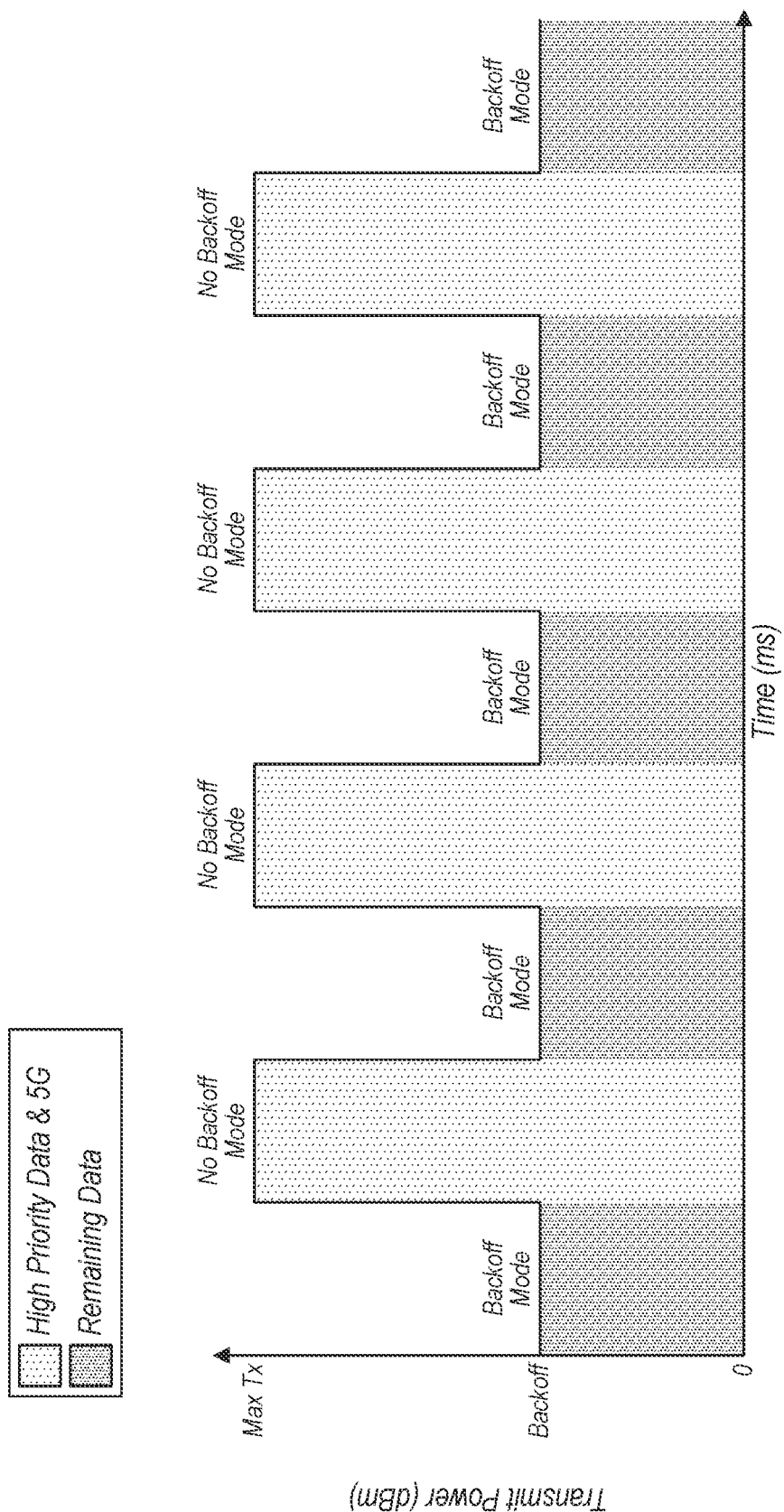
FIG. 8 illustrates allocation of high priority data and 5G communications during normal mode during a transmit power duty cycle, according to some embodiments.

In some embodiments, the UE may be operating in an ENDC deployment, and may be connected to both an LTE MCG and a 5G SCG. In these embodiments, the UE may preferentially transmit data to the NR SCG during normal mode and may transmit data to the LTE MCG during back-off mode. For example, the UE may bias the update UL-DataSplitThreshold parameter locally to bias the transfer to LTE during back-off mode, to cause the UE to prioritize data on LTE MCG. In some embodiments, the UE may send a Buffer Status Report (BSR) to indicate to the network which data it wants to send. In other words, in some embodiments, the UE may consider one or both of the priority of data and the RAT associated with the data (e.g., 5G or non-5G) when determining whether to transmit the data during normal mode or back-off mode. This is illustrated in FIG. 8, which shows high priority data and 5G communications being transmitted during normal mode, while remaining data (e.g., low priority data and non-5G communications) is transmitted during back-off mode. If there are remaining unused radio resources during normal mode after all high priority data and 5G communications have been transmitted, the remaining unused radio resources may be utilized for at least a portion of any remaining data to be transmitted, in some embodiments.

Figure 9A:
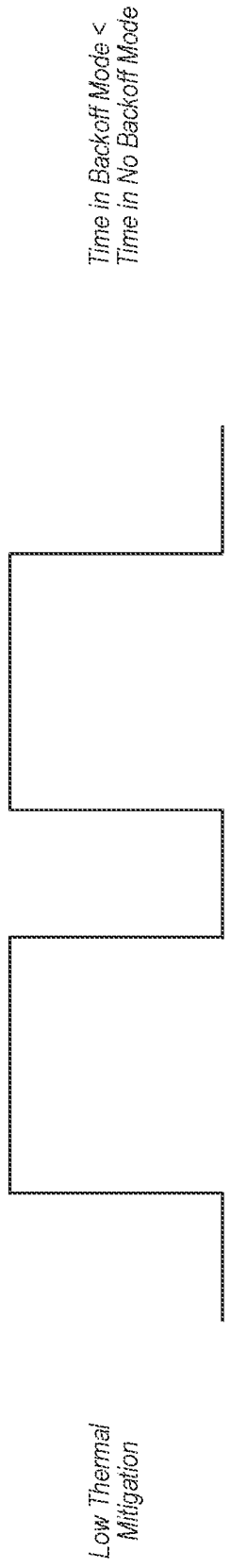
FIGS. 9A-C illustrates three different duty cycles for implementing back-off mode, depending on the degree of thermal mitigation, according to some embodiments.
Figure 9B:
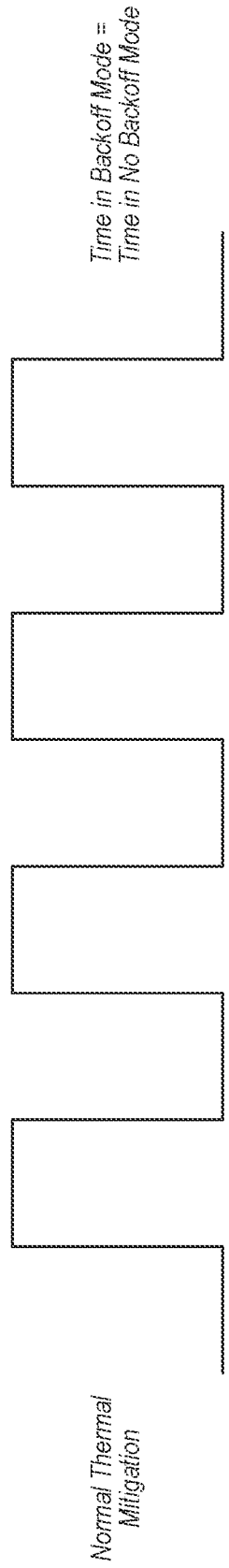
Figure 9C:
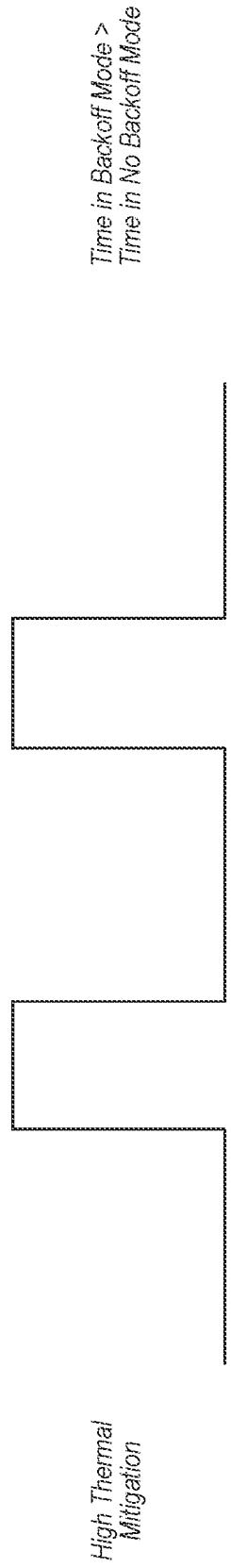

In some embodiments, the UE temperature may be continuously monitored and the duty cycle of alternating between normal and back-off modes may be adjusted depending on how much thermal mitigation is desired. For example, as illustrated in FIGS. 9A-C, three different duty cycles may be employed depending on the degree of desired thermal mitigation. Specifically, for low thermal mitigation (e.g., when the temperature is only marginally higher than the temperature threshold, and/or when the temperature is increasing slowly or even modestly decreasing), the UE may spend more time in normal mode than in back-off mode. For normal thermal mitigation (when the temperature is higher than for low thermal mitigation and/or it is increasing more rapidly), the UE may spend an equal (or approximately equal) amount of time in normal and back-off mode. Finally, if high thermal mitigation is desired (e.g., if the temperature is dangerously high, and/or is increasing at a dangerously fast rate), the UE may spend more time in back-off mode than in normal mode.

Figure 10:
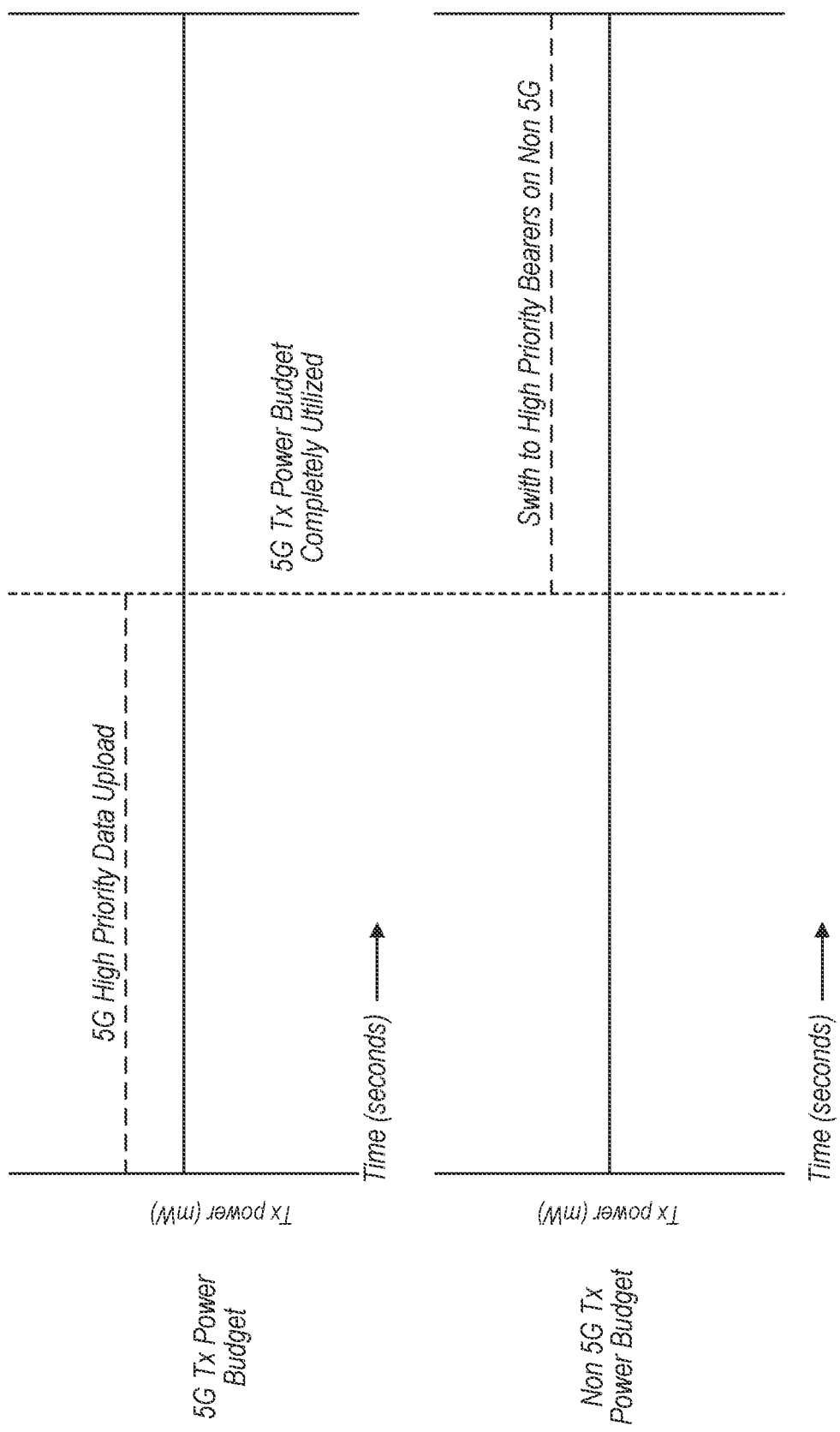
FIG. 10 is a schematic diagram illustrating a 5G transmission power budget, according to some embodiments.

In some embodiments, the UE may implement an overall available power budget whereby, for a given time window, the UE has an allowable power budget for 5G transmissions. This is illustrated schematically in FIG. 10, where a UE transmits 5G high priority data for a first period of time until the available 5G power budget is exhausted, whereupon the UE switches to transmitting the high priority data over a non-5G data bearer (e.g., it may transmit the data to an eNB over LTE). For example, when the overall power budget for 5G is exhausted, the UE may inform the network of an SCG failure so it may migrate to a high priority data bearer on non-5G.

Figure 11:
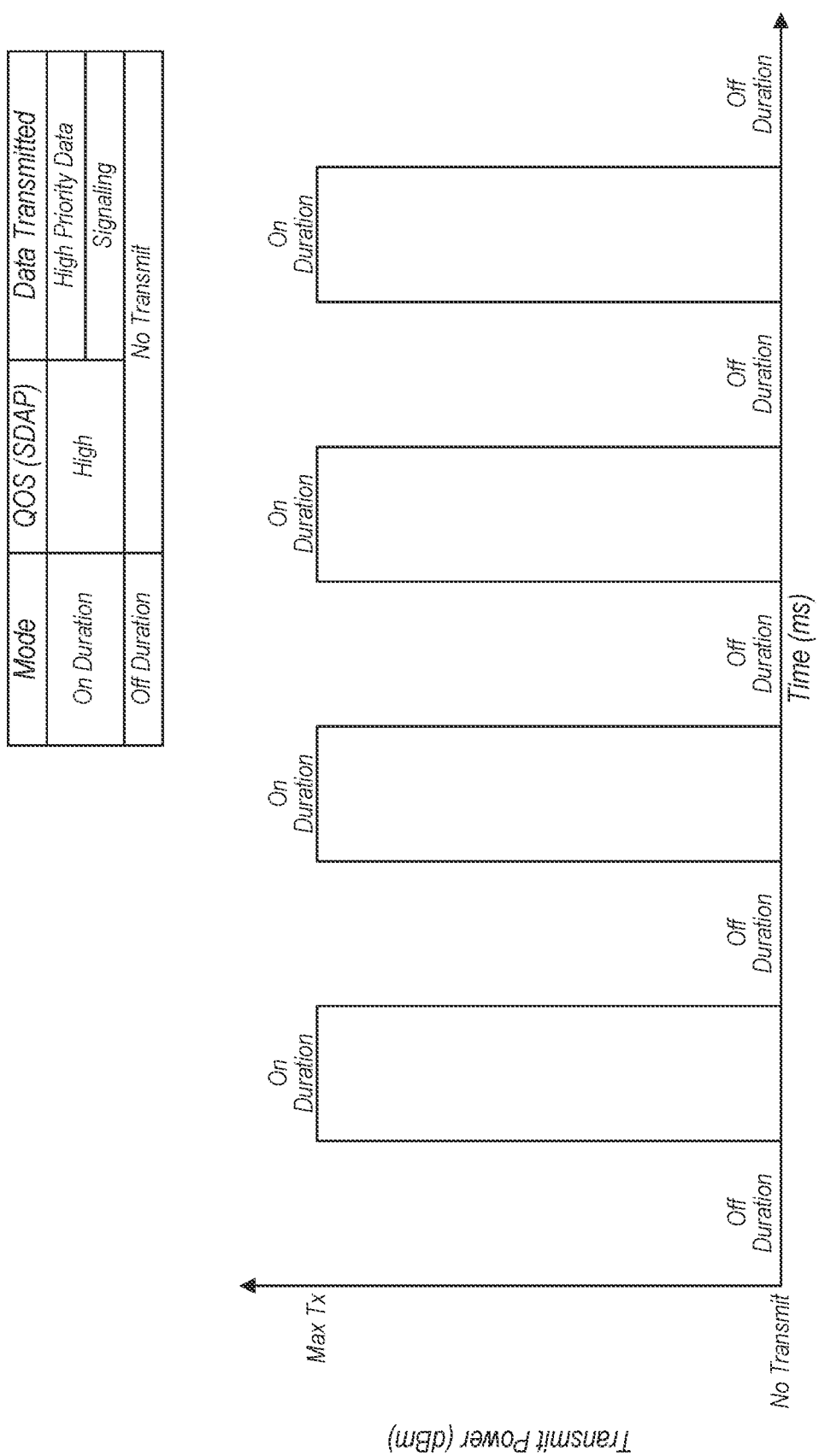
FIG. 11 illustrates a periodic alternation between normal mode and transmit power shutoff mode, according to some embodiments.

In some embodiments, when high thermal mitigation is desired, the UE may alternate between normal mode operation and shutting off all transmit power. This is illustrated in FIG. 11, where a device periodically alternates between normal mode operation and a transmit power shutoff mode, wherein the UE refrains from performing any transmissions. In these embodiments, the UE may determine the transmit power on duration based on an amount of high priority data and signaling to be transmitted, and may prioritize high priority data and signaling for transmission during normal mode operation.

Figure 12:
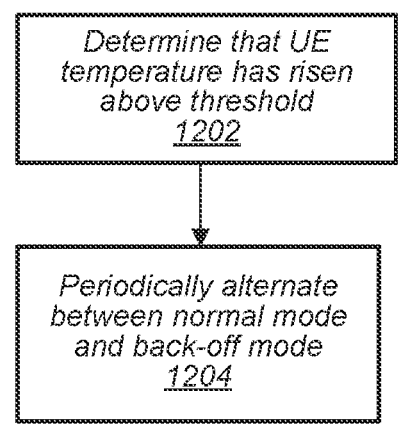
FIG. 12 is a flowchart diagram illustrating a method for implementing a transmission power back-off mode for thermal mitigation, according to some embodiments.

FIG. 12—Flowchart for Implementing Back-off Mode

FIG. 12 is a flowchart diagram illustrating a method for implementing a transmission power back-off mode for thermal mitigation, according to some embodiments. Aspects of the method of FIG. 12 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry (e.g., 330), etc., among various possibilities) may cause the UE to perform some or all of the illustrated method elements. Similarly, processor(s) 404, baseband processor(s), processor(s) associated with communication circuitry (e.g., 430, 432), etc., among various possibilities) may cause the BS to perform some or all of the illustrated method elements.

In various embodiments, some of the elements of the method shown may be performed concurrently, in a different order than shown, may be substituted for by other method elements, or may be omitted. Additional method elements may also be performed as desired. As shown, the method may operate as follows.

At 1202, it is determined that a temperature of the UE has risen above a first threshold temperature. For example, the UE may be equipped with one or more temperature sensors that are configured to periodically or continuously measure the temperature of one or more components of the UE. In some embodiments, the temperature sensor(s) may be configured to measure a component of the UE that typically experiences the largest degree of heating from performing cellular transmissions, such as a radio and/or processor of the UE.

At 1204, based at least in part on determining that the temperature of the UE has risen above the first threshold temperature, the UE periodically alternates between operating in a standard mode and a back-off mode. The UE is configured to transmit at a normal transmit power while in the standard mode, and the UE is configured to transmit at a reduced transmit power while in the back-off mode.

In some embodiments, a duty cycle for alternating between the standard mode and the back-off mode is determined based at least in part on a number of degrees by which the temperature of the UE has risen above the first threshold temperature. For example, the duty cycle may be selected such that the UE spends more time in the back-off mode for a higher temperature of the UE than for a lower temperature of the UE. Alternatively or additionally, the duty cycle for alternating between the standard mode and the back-off mode may be determined based at least in part on a rate of increase of the temperature of the UE. For example, the duty cycle may be selected such that the UE spends more time in the back-off mode for a faster rate of increase of the temperature of the UE than for a lower rate of increase of the temperature of the UE. In some embodiments, a weighted consideration of both the absolute temperature and the rate of increase of the temperature of the UE may be used to determine the duty cycle.

In some embodiments, high priority data is preferentially transmitted while operating in the standard mode, and low priority data is preferentially transmitted while operating in the back-off mode. The high priority data may include one or more of live video streaming, voice calls, and/or control signaling. Conversely, the low priority data may include one or more of transmission control protocol (TCP) data, user datagram protocol (UDP) data, and/or buffered video streaming.

In some embodiments, the UE may have established an Evolved Universal Terrestrial Radio Access (EUTRA) New Radio (NR) Dual Connectivity (ENDC) connection with an eNB and at least one gNB. In these embodiments, the UE may be configured to preferentially communicate with the eNB over a Long Term Evolution (LTE) radio access technology (RAT) while operating in the back-off mode, and the UE may be configured to preferentially communicate with the gNB over a 5th Generation New Radio (5G NR) RAT while operating in the normal mode.

In some embodiments, the UE may have a transmission power budget associated with the 5G NR RAT, wherein there is a maximum budget of transmission power that the UE is allowed to utilize in a given time window of a predetermined duration. In these embodiments, the UE may determine that a transmission power budget associated with the 5G NR RAT has been exhausted. Based at least in part on determining that the transmission power budget associated with the 5G NR RAT has been exhausted, the UE may switch to communicating with the eNB over the LTE RAT for the remainder of the time window, while operating in the normal mode.

In some embodiments, the UE may determine that the temperature of the UE has risen above a second threshold temperature, where the second threshold temperature is higher than the first threshold temperature. Based at least in part on determining that the temperature of the UE has risen above the second threshold temperature, the UE may periodically alternate between operating in the standard mode and transmit power shutoff mode, where the UE is configured to refrain from performing any transmissions during the transmit power shutoff mode.

Figure 13:
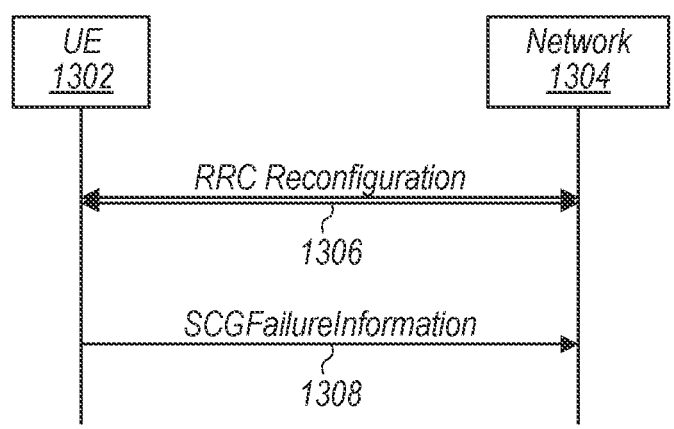
FIG. 13 is a communication flow diagram illustrating a method for a UE to drop a 5G gNB and communicate exclusively over LTE, in some embodiments.

FIG. 13—Protocol for Halting 5G Transmissions

FIG. 13 is a communication flow diagram illustrating a method for a UE to drop a 5G gNB and communicate exclusively over LTE, in some embodiments. For example, a UE operating in an ENDC deployment may decide to drop the 5G gNB as a SCG, and may decide to communicate only with the eNB MCG over LTE. To accomplish this, the following protocol may be implemented, among other possibilities. At 1306, the UE may request a radio resource control (RRC) reconfiguration from the network. Subsequently, at 1308, the UE may send a "SCGFailureInformation" message to the network through the gNB. This may allow the UE to fall back to LTE operation with the eNB and it may no longer expend power in monitoring 5G cells.

In some embodiments, upon initiating a procedure to cease communications with a gNB, the UE may suspend SCG transmissions for all signaling radio bearers (SRBs) and data radio bearers (DRBs); reset the SCG-MAC; stop a T304 timer, if running; and if the UE is operating in EN-DC, initiate transmission of the SCGFailureInformationNR message and set the failure type as due to T310 timer expiry.

Reduced 5G Measurements for ENDC Deployments

In previous implementations, when an application processor (AP) of a UE is asleep, the baseband processor (BB) of the UE may only wake up the AP if there are incoming internet protocol (IP) packets targeted to known port numbers (e.g., the known port numbers may be a plurality of port numbers that are known by the UE to be relevant to the AP). This may avoid unnecessarily waking up AP when the BB receives packets that are not relevant to the AP. However, in NR deployments, the NR SCG bearer may be configured immediately after a UE enters an RRC Connected state based on the NR measurements reported by the UE. In these implementations, as soon as the NR SCG bearer is configured, the BB may wake up the AP in order to update the user interface (UI) icon to display "5G". In these cases, if the incoming downlink IP packet belongs to an unknown port number, this packet may not be relevant to the AP. However, since the NR SCG is configured in this instance, the BB may still wake up the AP to update the UI icon, leading to unnecessary power drain.

To address these and other concerns, in some embodiments, when the AP is asleep and the BB initiates a radio connection for either an incoming page or BB centric traffic (e.g., subscriber identity module (SIM) traffic), the AP may refrain from performing NR cell measurements. Additionally or alternatively, depending on a temperature of the UE, the UE may determine whether NR/ENDC should be operated in the Sub6 or the mmW frequency range. For example, if the temperature is sufficiently high that mmW operation is undesirable, the UE may refrain from performing any mmW cell measurements and only perform Sub6 cell measurements, such that the ENDC bearer is added for Sub6 only.

Pruning Cell Measurements Based on Ongoing Active Traffic

In some embodiments, before an RRC Connection is established, the UE may decide whether to prune out NR measurements or not. In some embodiments, if a display of the UE is either off or in an idle state, and/or if there is a low level of ongoing data transfer and/or a low-level traffic class, the UE may prune out (i.e., refrain from performing) both Sub6 and mmW measurements. If a medium level of data transfer/traffic class is ongoing, the UE may prune out only mmW measurements. Conversely, if a high level of data transfer/traffic class is ongoing (e.g., if there are multiple traffic classes and/or a large quantity of ongoing data) the UE may perform both Sub6 and mmW measurements as normal.

In some embodiments, if the UE is in a high mobility state, and further if the UE has encountered multiple beam failures over a short period of time (e.g., if the number of beam failures over a predetermined period of "x" seconds is greater than a threshold "y" number of beam failures), the UE may prune out mmW measurements for a specific duration while the UE is in the high mobility state. In some embodiments, instead of pruning measurements completely, the UE may continue measuring NR frequencies, but the RRC layer may not report the NR measurement reports unless a high priority traffic class (e.g., an application launching high priority data) is active. Advantageously, in these embodiments, the measurements may be readily available and may be immediately sent to the NW when desired. This may reduce the delay to add a NR SCG from a few seconds to a few milliseconds, for example.

In previous implementations, if the UE enables an application which utilizes a higher data usage for a prolonged time duration (e.g., a video streaming use case), the UE may report mmW measurement results for multiple gNBs and/or multiple component carriers (CCs), and the NW may add mmW multiple component carriers for servicing the UE, potentially leading more quickly to a thermal trap being hit. To address these and other concerns, the UE may restrict its mmW measurement reporting to a small number of CCs (e.g., 1 or 2, depending on the data requirements of the active application), so that the NW adds a smaller number of mmWave cells, thereby providing a higher NR throughput as well as reducing the chance of hitting a thermal trap due to prolonged application usage. In other words, if the UE detects the activation of a long-duration high-throughput data application, the UE may restrict the number of mmW measurements to a small predetermined number, to satisfy the throughput requirements while mitigating the risk of overheating. In some embodiments, the specific frequencies that UE picks for performing mmW measurements may be determined based one or more considerations including, but not limited to, the result of previous mmW measurements; past heuristics like PHY, L2 and beam characteristics; a number of times the particular mmW frequency was present in a previous Scell/PScell list (e.g., the PScell list may be considered higher priority); or presence in a table of information regarding most recently camped-on cells, such as a most recently used (MRU) table, among other possibilities.

Selective Disabling of Particular NR SCells

In some embodiments, particular NR gNB SCells may be associated with higher thermal concerns due to the band and/or frequency of their operation. Based on the block error rate (BLER) and/or the signal-to-interference-plus-noise ratio (SINR), the UE may detect which SCell(s) are performing worse. In current implementations, an overheating indication may cause a UE to reduce the number of active CCs, reduce the aggregated bandwidth, and/or reduce the number of active multiple-input multiple output (MIMO) layers. To improve on these implementations, in some embodiments, the UE may indicate to the network which SCell identifier (ID) it prefers to drop first in the case of an overheating scenario. In various embodiments, the UE may indicate either a single Cell ID or a drop priority list including a ranked plurality of SCell IDs (e.g., {ID1, ID2, ID3}) which indicates an order for dropping SCells (e.g., first drop the SCell associated with ID1, followed by the SCells associated with ID2, and finally ID3).

Selective CA Combo Reporting to Reduce Thermal Impact

While operating in either NSA or SA mode, a UE may employ Carrier Aggregation (CA) on one or more NR SCGs. The number of SCell CCs added to the PCell may be dependent on the total channel bandwidth (TCB) supported by the UE. For example, if a UE supports a maximum channel bandwidth of 800 MHz, the UE may allocate the 800 MHz between the MCG and the SCGs as follows:

Serving Cell=200 MHz
Component Carrier 1=200 MHz
Component Carrier 2=200 MHz
Component Carrier 3=100 MHz
Component Carrier 4=50 MHz
Component Carrier 5=50 MHz In the above example there may be cases where it is desirable for the UE to reduce the number of CCs. However, while in RRC-Connected mode, decisions to add or release SCells are typically made by the NW. Accordingly, in some embodiments, a UE may employ alternative mechanisms to reduce the number of active SCell CCs. For example, in some embodiments, if the UE would like to release one or more SCells, the UE may report to the network a reduced maximum channel bandwidth (MCB) that it supports via a UE capability change message.

Figure 14:
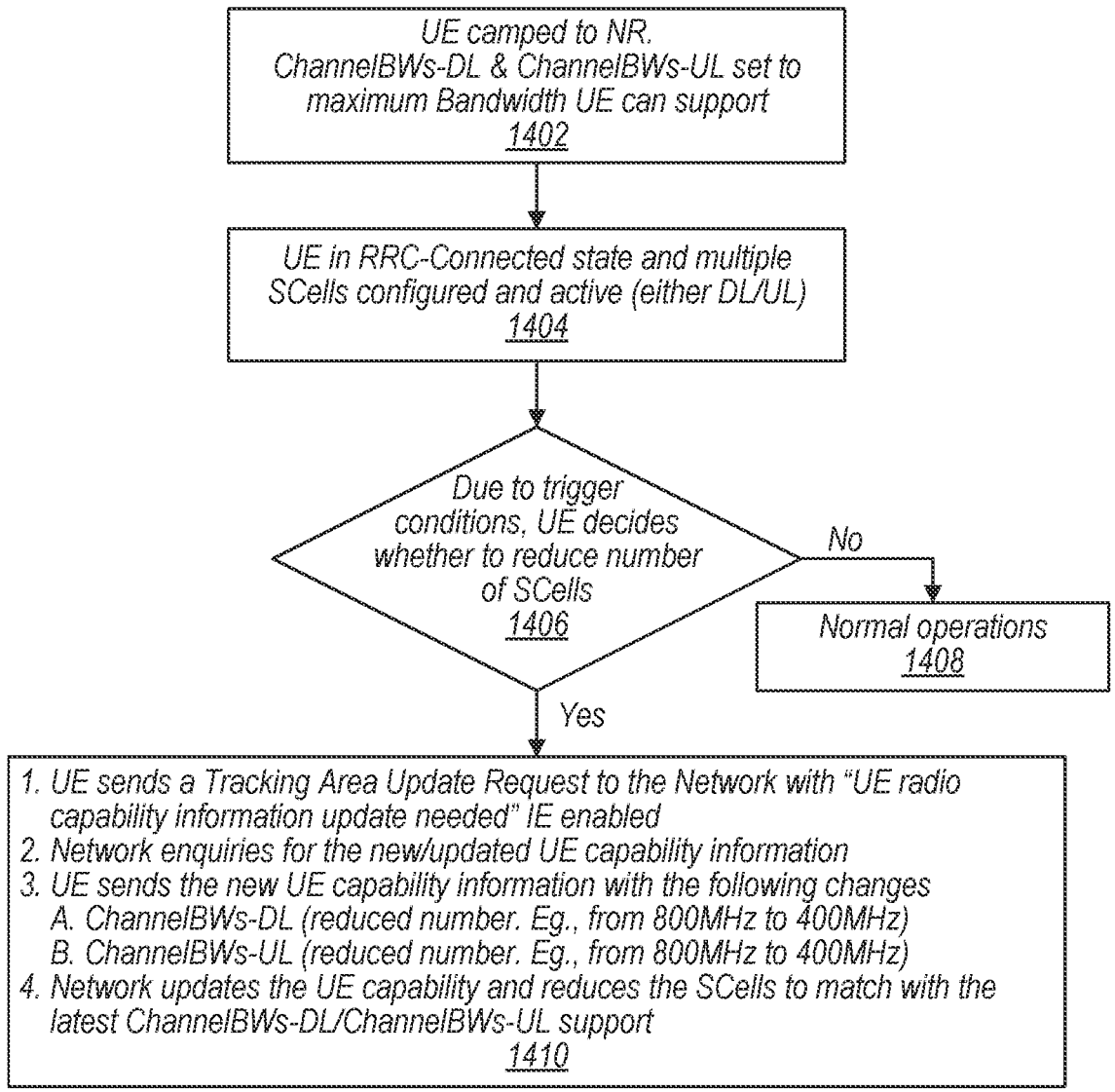
FIG. 14 is a flowchart diagram illustrating a method for a UE to reduce the number of active SCells in communication with the UE, according to some embodiments.

FIG. 14 is a flowchart diagram illustrating a method for a UE to reduce the number of active SCells in communication with the UE, according to some embodiments. Aspects of the method of FIG. 14 may be implemented by a wireless device, such as the UE(s) 106, in communication with one or more base stations (e.g., BS 102) as illustrated in and described with respect to the Figures, or more generally in conjunction with any of
the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry (e.g., 330), etc., among various possibilities) may cause the UE to perform some or all of the illustrated method elements. Similarly, processor(s) 404, baseband processor(s), processor(s) associated with communication circuitry (e.g., 430, 432), etc., among various possibilities) may cause the BS to perform some or all of the illustrated method elements.

In various embodiments, some of the elements of the method shown may be performed concurrently, in a different order than shown, may be substituted for by other method elements, or may be omitted. Additional method elements may also be performed as desired. As shown, the communication flow for releasing one or more SCells may proceed as follows:

At 1402, a UE may camp on a plurality of SCells, and may set a maximum channel bandwidth supported by the UE for both uplink (UL) and downlink (DL). The SCells may be 5G gNBs, in some embodiments.

At 1404, the UE may be in an RRC-Connected state with the multiple SCells configured for communications and active in one or both of UL and DL.

At 1406, based on certain trigger conditions, the UE may decide to release some of the SCells. The UE may decide to reduce the number of active SCells for a variety of reasons, including but not limited to battery savings, low battery, high BLER, frequent RLFs, and/or thermal mitigation. If a trigger condition is not present, the UE may continue with normal operations at 1408.

At 1410, if a trigger condition is present, the UE may send a Tracking Area Update Request to the Network with a "UE radio capability information update needed" information element (IE) enabled. In response, the network may inquire to the UE for the new/updated UE capability information. Finally, the UE may explicitly advertise a lower MCB than its actual MCB, so that the NW will configure the UE with a smaller subset of CCs. Additionally or alternatively, the UE may advertise a specific subset of CA combination which has a low thermal impact, but may provide high throughputs. For example, CA_1A_3A_5A and CA_25A_12A_66A may have the same aggregated bandwidth and number of CCs, however CA_1A_3A_5A may have a lower thermal impact. Accordingly, the UE may refrain from advertising CA_25A_12A_66A, and may advertise CA_1A_3A_5A.

Selective Measurement Pruning Based on Active Bandwidth Part

In some embodiments, thermal conditions may make it desirable for a UE in an ENDC connection to disable its LTE and/or its NR radio to bring down the temperature in the device. In these embodiments, a UE may consider both the frequency range used in the ENDC connection as well as the bandwidth of the active bandwidth part (BWP) in determining whether and how to prune cell measurements.

For example, a UE may determine that its temperature has risen above a threshold such that a temperature mitigation procedure may be implemented as follows, in various scenarios. First, when the UE is communicating with both an LTE eNB and a Sub6 gNB, if the NR active BWP is greater than a threshold bandwidth (e.g., 20 MHz), the UE may push UL traffic to LTE and monitor thermal conditions. If the temperature continues to increase consistently within a predetermined number of minutes (or seconds), the UE may disable NR by sending a SCGFailureInformation and pruning further NR cell measurements. Alternatively, when the UE is communicating with both an LTE eNB and a mmW gNB, if the NR active BWP is greater than the threshold bandwidth, the UE may immediately disable NR by sending a SCGFailureInformation, and pruning future NR cell measurements.

Alternatively, when the UE is communicating with both an LTE eNB and a Sub6 gNB, and the NR active BWP is less than the threshold bandwidth, the UE may continue both UL & DL traffic with LTE and NR. When the UE is communicating with both an LTE eNB and a mWW gNB and the NR active BWP is less than the threshold bandwidth, UL traffic may be pushed to the MCG (e.g., by sending a BSR 0 message to the mmW gNB) and DL traffic may follow NW scheduling.

While the example given above specifies a threshold BW of 20 MHz, other threshold BWs may also be used, as desired. However, 20 MHz may exhibit some benefits as a threshold BW. For example, 20 MHz is the maximum bandwidth for LTE communications, such that 20 MHz may be used as an estimate of the bandwidth above which NR communications begin to exhibit significantly more battery drain and or heat production than LTE communications. Accordingly, the heat mitigation of shunting communications to LTE may become more pronounced for NR communications over 20 MHz in bandwidth.

In other embodiments, rather than pruning NR cell measurements in an ENDC communication environment when thermal mitigation is initiated, the UE may utilize UE assistance information to reduce the BW of the NR communications iteratively to 20 MHz. Once the NR BW reaches 20 Mhz, the UE may proceed to iteratively reduce the BW for the LTE PCC. Alternatively or additionally, the UE may change the active BWPs.

Diverting Traffic Depending on UL Limited conditions

In some embodiments, a UE in an ENDC coverage scenario may divert traffic between LTE and NR RATs depending on uplink (UL) conditions. For example, in some embodiments, if LTE coverage is UL limited and NR is in good coverage, the UE may send a BSR "0" message to the LTE eNB and move all UL traffic to the NR gNB. Advantageously, this may reduce the active transmission power and mitigate thermal heating. Alternatively, if NR is in UL limited coverage and LTE is in good coverage, the UE may send a BSR "0" message to the NR gNB and move all UL traffic to the LTE eNB.

If LTE and NR are both UL limited, the UE may disable NR by sending a SCGFailureInformation message. Further, if the UL traffic is not critical UL traffic (e.g., if it is below a threshold level of priority), the UE may delay the UL traffic over LTE until the thermal conditions improve. Alternatively, if both LTE and NR are UL limited, the UE may enable a supplementary UL (SUL) channel and may move all UL traffic to the SUL channel.

Figure 15:
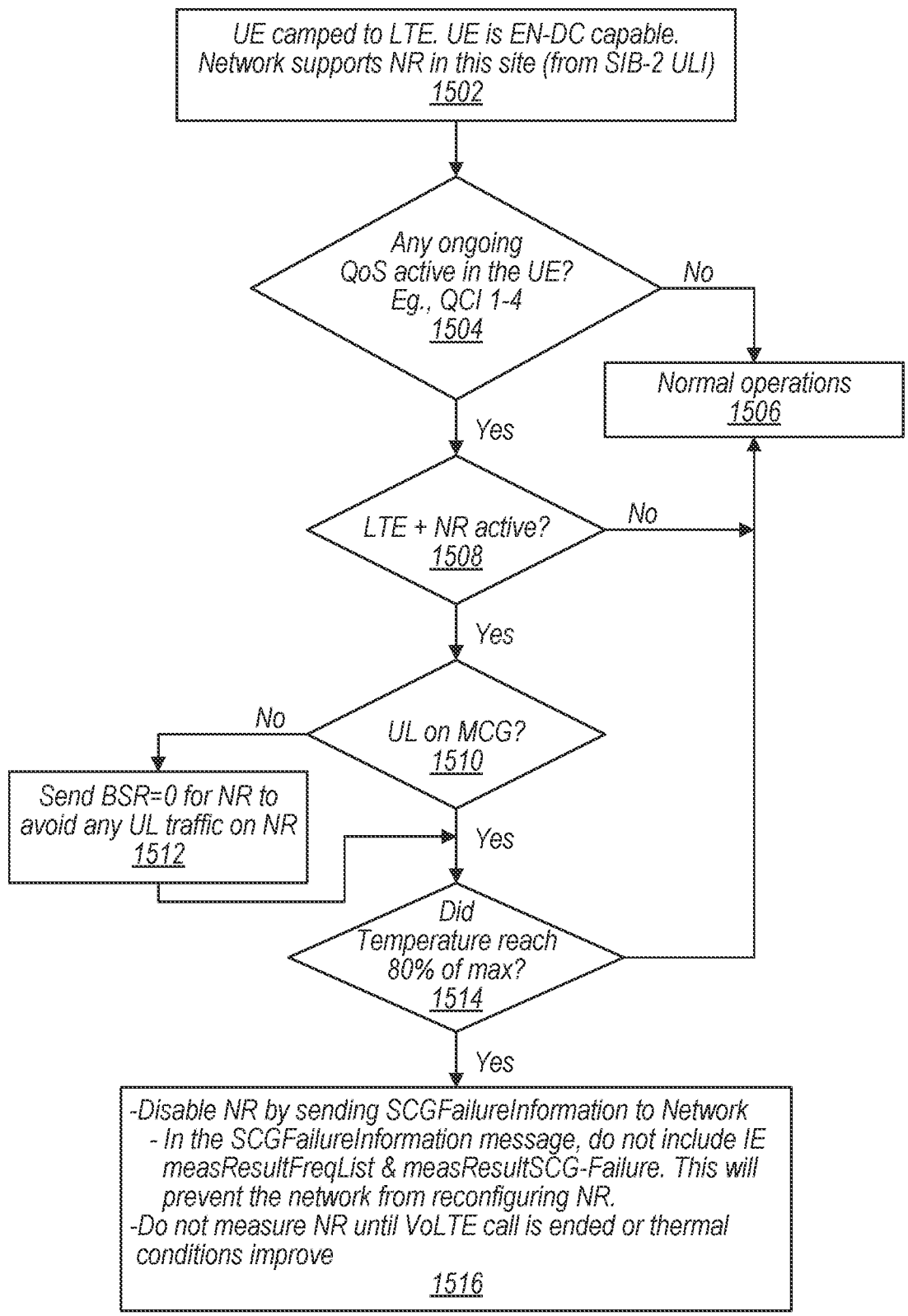
FIG. 15 is a flowchart diagram illustrating a method for performing selective NR cell measurement pruning, according to some embodiments.

FIG. 15—Selective Measurement Pruning During High Priority Data Sessions

In some embodiments, a UE in a NSA deployment (e.g., an ENDC scenario) may have an ongoing high priority data transfer with a high quality of service (QoS) requirement, such as a voice over LTE (VoLTE) call. FIG. 15 is a flowchart diagram illustrating a method for performing selective NR cell measurement pruning in this or other scenarios, according to some embodiments. Aspects of the method of FIG. 15 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry (e.g., 330), etc., among various possibilities) may cause the UE to perform some or all of the illustrated method elements. Similarly, processor(s) 404, baseband processor(s), processor(s) associated with communication circuitry (e.g., 430, 432), etc., among various possibilities) may cause the BS to perform some or all of the illustrated method elements.

In various embodiments, some of the elements of the method shown may be performed concurrently, in a different order than shown, may be substituted for by other method elements, or may be omitted. Additional method elements may also be performed as desired. As shown, the method may operate as follows.

At 1502, a UE that is capable of ENDC is camped on an LTE eNB. The NW may support NR ENDC from the location of the UE, which may be enabled via system information block 2 (SIB-2) uplink information (ULI).

At 1504, the UE may determine whether there is an ongoing high priority data session with a high QoS requirement (e.g., a QoS class identifier (QCI) of 1-4), such as a VoLTE call. If a high QoS session is not ongoing, the UE may revert to normal operations at step 1506.

At 1508, if a high QoS session is ongoing, the UE may determine whether both LTE and NR are currently active on the device (e.g., the UE may determine whether it has an active connection with both an eNB and a gNB associated with the ENDC deployment). If both LTE and NR are not currently active on the device, the UE may revert to normal operations at step 1506.

At 1510, if both LTE and NR are currently active, the UE may determine whether all UL data is being transmitted to the MCG (e.g., on the LTE eNB). If it is determined that the UL data is not being performed over the MCG, at step 1512 the UE may send a BSR 0 message to the NR gNB to avoid any UL traffic on the NR gNB, and the UE may then proceed to step 1514.

At 1514, if it is determined that all UL data is being transmitted to the MCG, the UE may determine whether a temperature of the UE is higher than a temperature threshold (e.g., 80% of the maximum safe temperate, or another threshold). If the temperature does not exceed the threshold, the UE may revert to normal operation at step 1506.

At 1516, if it determined that the temperate exceeds the temperature threshold, the UE may implement a NR cell measurement pruning procedure. For example, the UE may disable the connection with the NR gNB by sending an "SCGFailureInformation" message to the network. In the SCGFailureInformation message, the UE may not include a measurement result frequency list ("measResultFreqList") or a measurement result Secondary Cell Group (SCG) failure ("measResultSCG-Failure) information element (IE). Advantageously, this may prevent the network from reconfiguring the NR connection. Additionally, the UE may refrain from conducting further NR cell measurements until the high priority data session is concluded and/or until the thermal conditions improve (e.g., the temperature drops below the threshold, or a predetermined number of degrees below the threshold).

Disable NR in SA deployments

Figure 16:
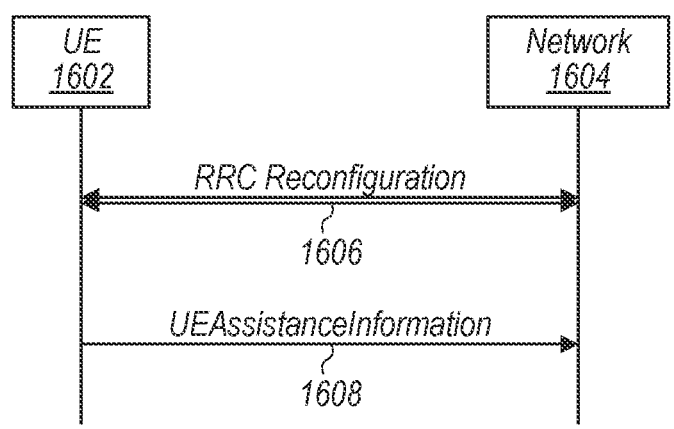
FIG. 16 is a communication flow diagram illustrating a method for a UE to reduce a maximum number of active component carriers, according to some embodiments.

In some embodiments, a UE may be in communication with a 5G gNB in a standalone (SA) connection, without being also connected to an LTE eNB. In these embodiments, various techniques may be implemented to mitigate overheating. For example, as illustrated in FIG. 16, the UE may send an UEAssistanceInformation message to the gNB to reduce a maximum number of CCs for the connection, to reduce a maximum aggregated BW in the combination of downlink (DL) and uplink (UL) for both Sub6 and mmW, and or reduce a maximum number of MIMO layers in DL and UL.

Alternatively, in some deployments the network may not support the UEAssistanceInformation message, and alternative methods may be employed. As one example, if the UE is experiencing overheating and the serving cell (e.g, the MCG) is a Sub6 gNB, the UE may perform inter-RAT B1 and/or B2 measurements. For example, B1 measurements may determine whether an inter-RAT neighbor (e.g., an LTE cell) has a signal strength that exceeds a threshold, while B2 measurements may determine whether both the serving cell becomes worse in signal strength than a first threshold and an inter-RAT neighbor cell becomes stronger in signal strength than a second threshold. In these embodiments, if during B1 and/or B2 inter-RAT measurements, the UE finds a qualifying LTE cell which is not in the same frequency range as the Sub6 gNB cell, the UE may disable NR and move to the LTE cell. Alternatively, if the B1 and/or B2 measurements find a qualifying LTE cell in same frequency range as the Sub6 gNB and the difference in signal strength (e.g., the received signal to received power, RSRP, ratio, or another measure of signal strength) between the serving gNB cell and the LTE cell is less than a threshold (e.g., within 3-5 dBm), the UE may remain camped on the gNB and avoid measuring LTE for a predetermined number of seconds.

In other embodiments, if the UE experiences overheating while it is camped on a mmW gNB, the UE may always disable NR and move to an LTE cell until thermal conditions improve, if an LTE cell is found that satisfies a B1 or B2 measurement.

Figure 17A:
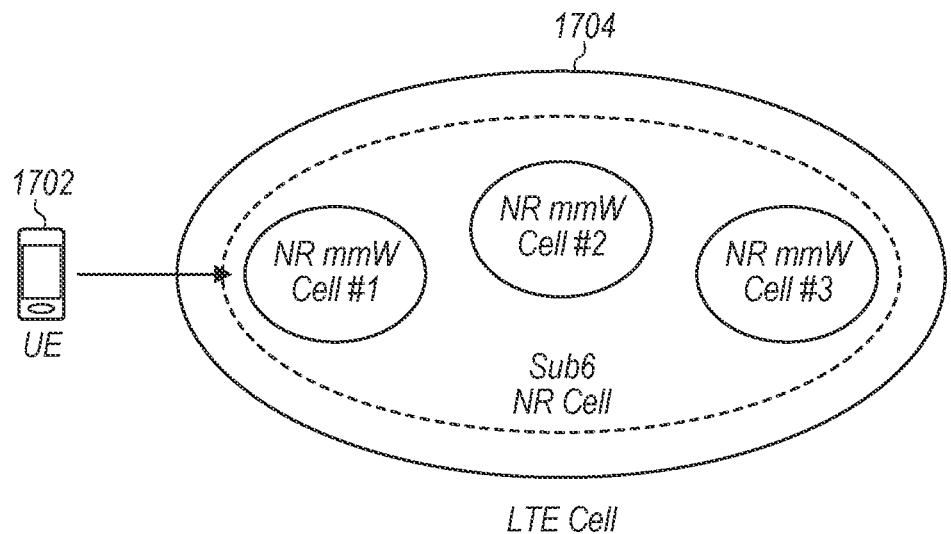
FIGS. 17A-B illustrate a UE moving between two different coverage scenarios, according to some embodiments.
Figure 17B:
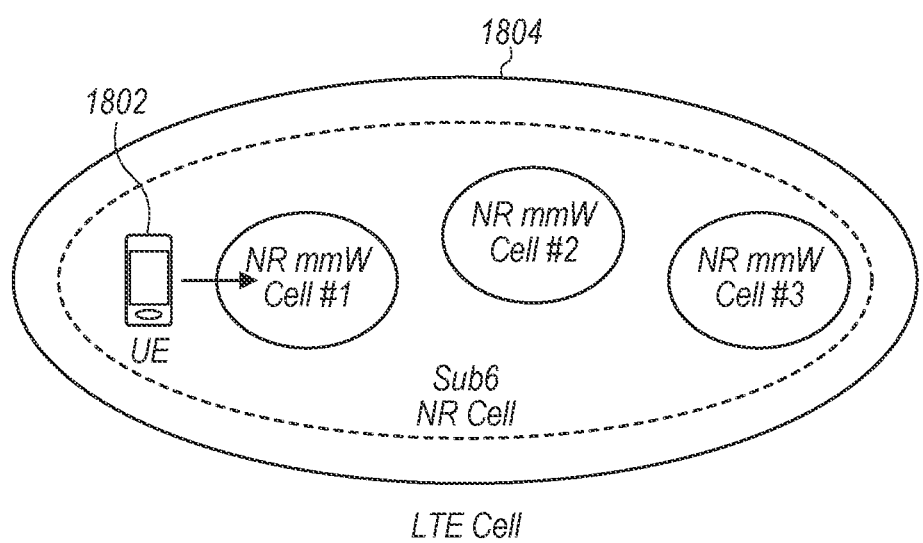

FIGS. 17A-B—Change in Coverage Scenario

FIGS. 17A-B illustrate a UE moving between two different coverage scenarios, according to some embodiments. Specifically, FIG. 17A shows a UE moving in the direction of an LTE cell and a Sub6 NR cell coverage boundary. FIG. 17B illustrates the UE within both the LTE cell and the Sub6 NR cell coverage, and moving towards an NR mmW cell (e.g., NR mmW cell#1). In this coverage scenario, the UE may be attached to the LTE cell as a MCG and may or may not be attached to the Sub6 NR cell as a SCG, as one example.

Figure 18:
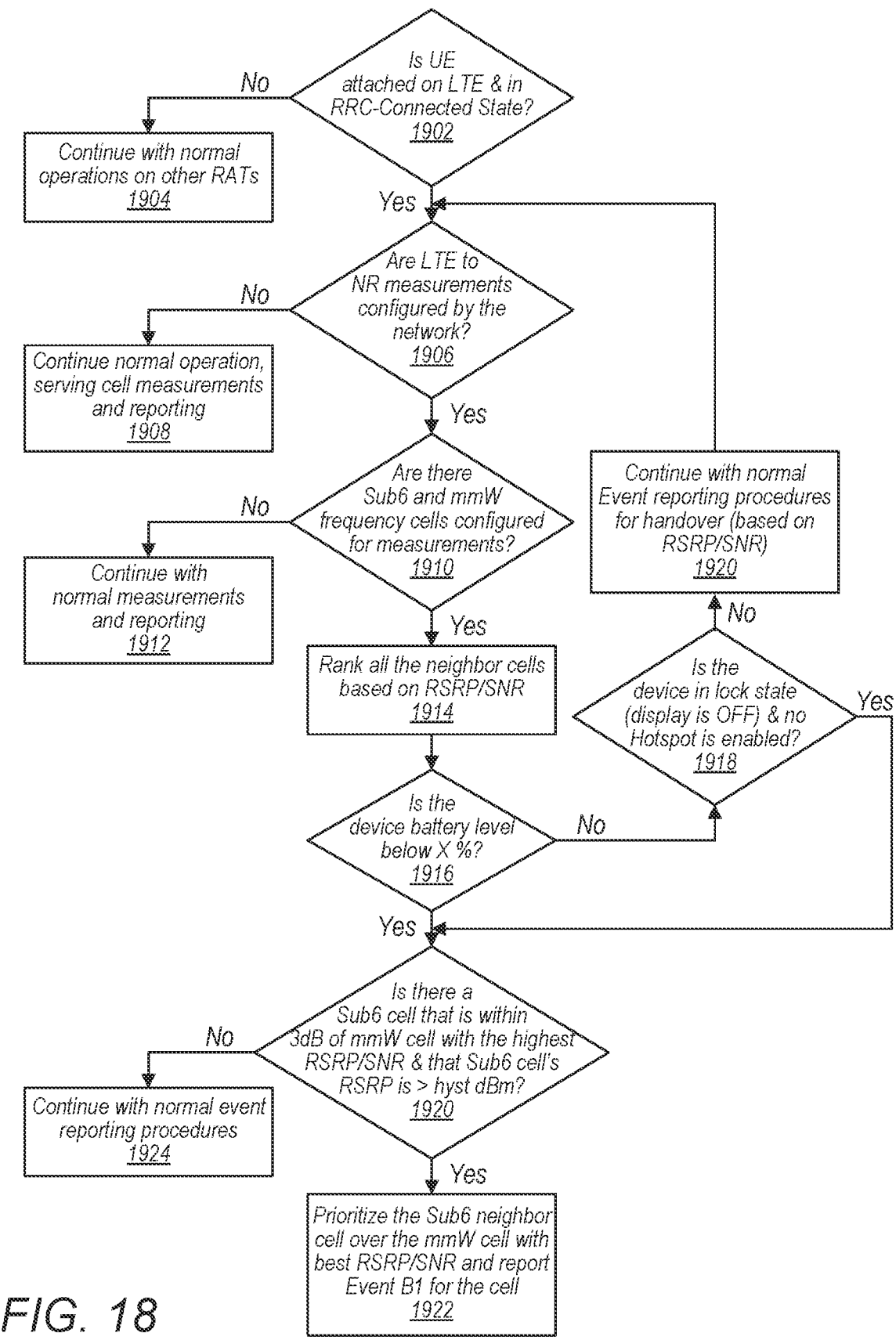
FIG. 18 is a flowchart diagram illustrating a method for a UE to perform cell measurements in an ENDC coverage scenario, according to some embodiments
Figure 19:
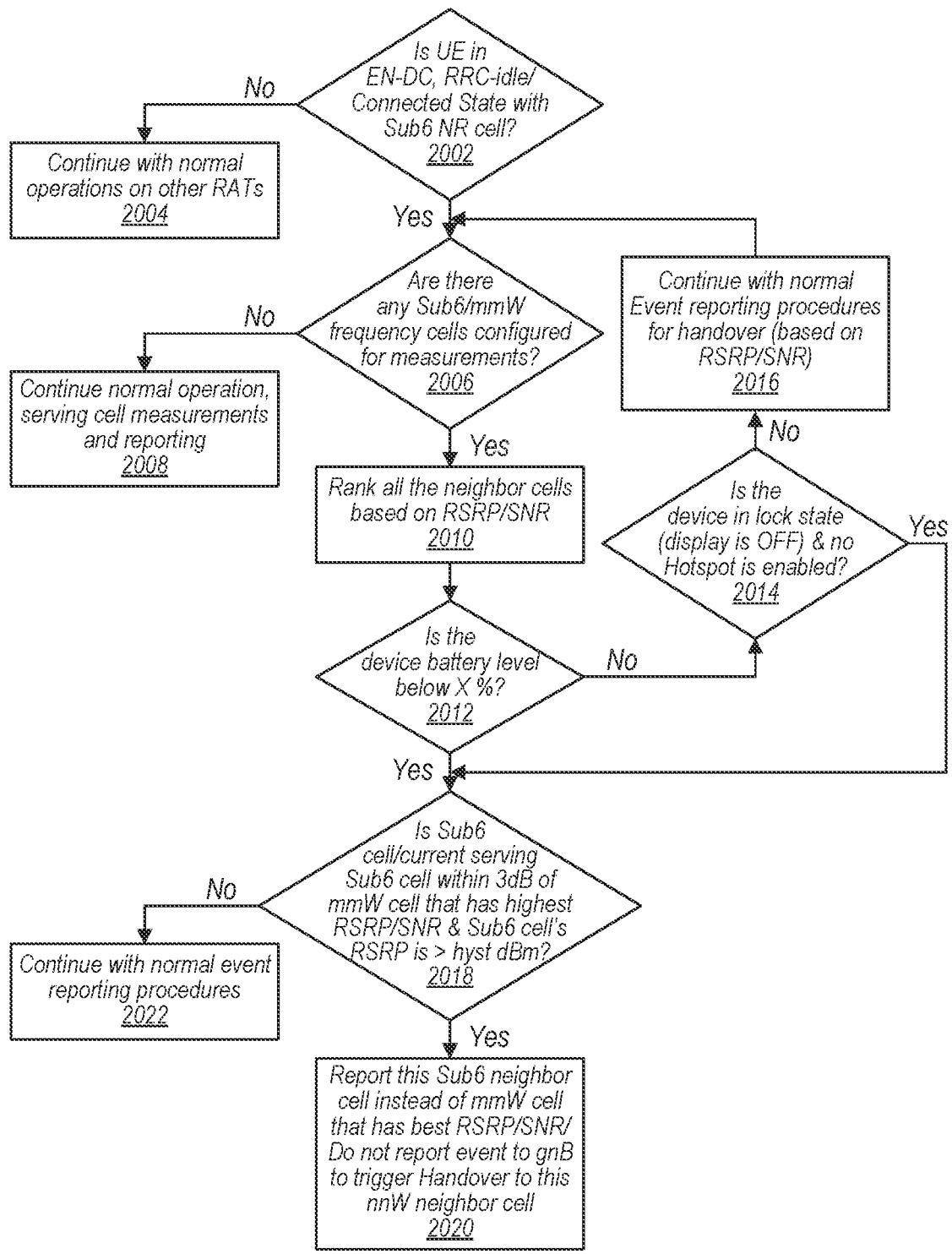
FIG. 19 is a flowchart diagram illustrating a method for a UE to perform cell measurements in an ENDC coverage scenario while in radio resource control (RRC) idle or connected mode, according to some embodiments.

FIGS. 18-19—Flowchart for Performing Cell Measurements in ENDC

FIG. 18 is a flowchart diagram illustrating a method for a UE to perform cell measurements in an ENDC coverage scenario, according to some embodiments. Specifically, FIG. 18 illustrates a method whereby a UE may prioritize a Sub6 NR cell over a mmW NR cell if certain criteria are met. At 1902, a UE determines whether it is attached to an LTE cell and is in an RRC Connected State. If not, the UE continues with normal operations at 1904. At 1906, the UE may determine whether NR measurements are configured by the network, and may determine at 1910 whether there are available Sub6 and mmW frequency NR cells configured for performing measurements on. If either determination is negative, the UE continues with normal operations at 1908 or 1912, respectively. At 1914, the available NR cells may be ranked based on their signal strength (e.g., their RSRP and/or SNR), and at 1916 it may be determined whether the remaining UE battery life is below a threshold level, such as 30%, 50%, or another threshold. If the battery life is below the threshold level, at 1920 the UE may determine whether there is an available Sub6 cell that is within a predetermined number of decibels (e.g., 3 dB) in signal strength to the mmW cell with the highest signal strength, and if so, whether that Sub6 cell's signal strength is greater than a hysteresis level. If no available Sub6 cell is within the predetermined number of decibels of the mmW cell, the UE continues with normal operations at 1924.

If the battery life is not below the threshold level, at 1918 the UE may check whether the UE is in a lock state, whether its display is off, and/or whether it is not currently functioning as a WLAN hotspot. If not, the UE continues with normal operations at 1920. If one or more of these conditions are met, the UE may likewise proceed to check for an available Sub6 cell that is within a threshold difference of signal strength from the strongest available mmW cell at 1920.

If the Sub6 cell is within the predetermined difference in signal strength from the strongest mmW cell, at 1922 the UE may prioritize the Sub6 cell over the mmW cell and report measurements on the Sub6 cell. In some embodiments, hysteresis may be employed where a cell Sub6 cell is not prioritized unless it has a signal strength greater than a hysteresis value such as −100 dBm. Once the battery level goes back above a threshold, this feature may be deactivated and normal reporting operations can be followed.

In some embodiments, subsequent to prioritizing the Sub6 cell, it may be determined that an application has initiated on the UE that utilizes high data throughput. At least in part in response to determining that the application has initiated on the UE that utilizes high data throughput, the UE may establish an ENDC connection with the eNB and a mmW NR cell for performing the high data throughput.

FIG. 19 is a flowchart diagram similar to FIG. 18 that additionally considers an embodiment where the UE is in an ENDC scenario and is attached to a Sub6 serving NR cell as well as an LTE cell in RRC Idle or Connected mode. In FIG. 19, if a battery level of the UE is below a threshold and/or if the UE is in a lock state, the UE may determine to not report measurements on a mmW cell even if it has a higher signal strength than the camped-on Sub6 cell. More specifically, FIG. 19 may proceed as follows.

At 2002, a UE determines whether it is engaged in an ENDC connection in an RRC Idle or Connected state with a Sub6 NR cell. If not, the UE continues with normal operations at 2004. At 2006, the UE may determine whether there are available Sub6 and mmW frequency NR cells configured for performing measurements on. If not, the UE continues with normal operations at 2008. At 2010, the available NR cells may be ranked based on their signal strength (e.g., their RSRP and/or SNR), and at 2012 it may be determined whether the remaining UE battery life is below a threshold level, such as 30%, 50%, or another threshold. If the battery life is below the threshold level, at 2018 the UE may determine whether there is an available Sub6 cell (including the serving Sub6 cell) that is within a predetermined number of decibels (e.g., 3 dB) in signal strength to the mmW cell with the highest signal strength, and if so, whether that Sub6 cell's signal strength is greater than a hysteresis level (e.g., −100 dBm or another threshold). If no available Sub6 cell is within the predetermined number of decibels of the mmW cell, the UE continues with normal operations at 2022.

If the battery life is not below the threshold level, at 2014 the UE may check whether the UE is in a lock state, whether its display is off, and/or whether it is not currently functioning as a WLAN hotspot. If not, the UE continues with normal operations at 2016. If one or more of these conditions are met, the UE may likewise proceed to check for an available Sub6 cell that is within a threshold difference of signal strength from the strongest available mmW cell at 2018.

If the Sub6 cell is within the predetermined difference in signal strength from the strongest mmW cell and the Sub6 cell's signal strength is greater than the hysteresis level, at 2020 the UE may report measurements on this Sub6 cell instead of the mmW cell with the best signal strength. Further, the UE may not report an event to the serving gNB (i.e., the serving Sub6 cell) to trigger a handover to this mmW cell. In some embodiments, hysteresis may be employed where a cell Sub6 cell is not prioritized unless it has a signal strength greater than a hysteresis value such as −100 dBm. Once the battery level goes back above a threshold, this feature may be deactivated and normal reporting operations can be followed.

Figure 20:
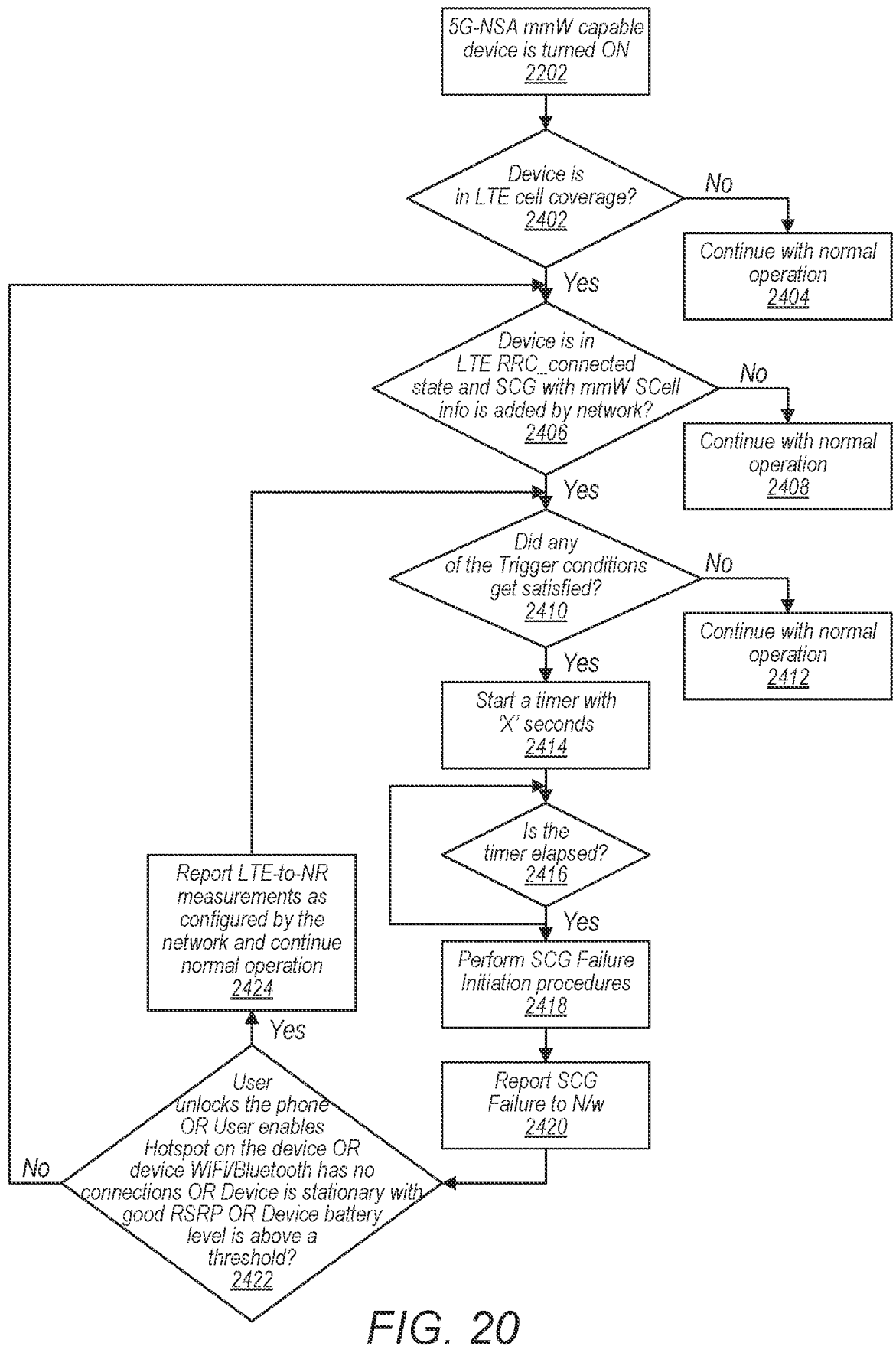
FIG. 20 is a flowchart diagram illustrating a method for performing an SCG failure initiation procedure, according to some embodiments.

FIG. 20—Flowchart for implementing SCG Failure Initiation Procedure

FIG. 20 is a flowchart diagram illustrating a method for implementing an SCG failure initiation procedure, according to some embodiments.

Aspects of the method of FIG. 5 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry (e.g., 330), etc., among various possibilities) may cause the UE to perform some or all of the illustrated method elements. Similarly, processor(s) 404, baseband processor(s), processor(s) associated with communication circuitry (e.g., 430, 432), etc., among various possibilities) may cause the BS to perform some or all of the illustrated method elements.

In various embodiments, some of the elements of the method shown may be performed concurrently, in a different order than shown, may be substituted for by other method elements, or may be omitted. Additional method elements may also be performed as desired. As shown, the method may operate as follows.

At 2202, an 5G-NSA mmW-capable UE device is turned on.

At 2402, it is determined whether the UE is in LTE cell coverage.

At 2404, if it is determined that the UE is not in LTE cell coverage, the UE may continue with standard operations.

At 2406, based on a determination that the UE is in LTE cell coverage, the UE may determine whether it is in an LTE RRC connected state and whether information related to an SCG with a mmW SCell has been received from the network. If not, the UE may continue with normal operation at step 2408.

Figure 21:
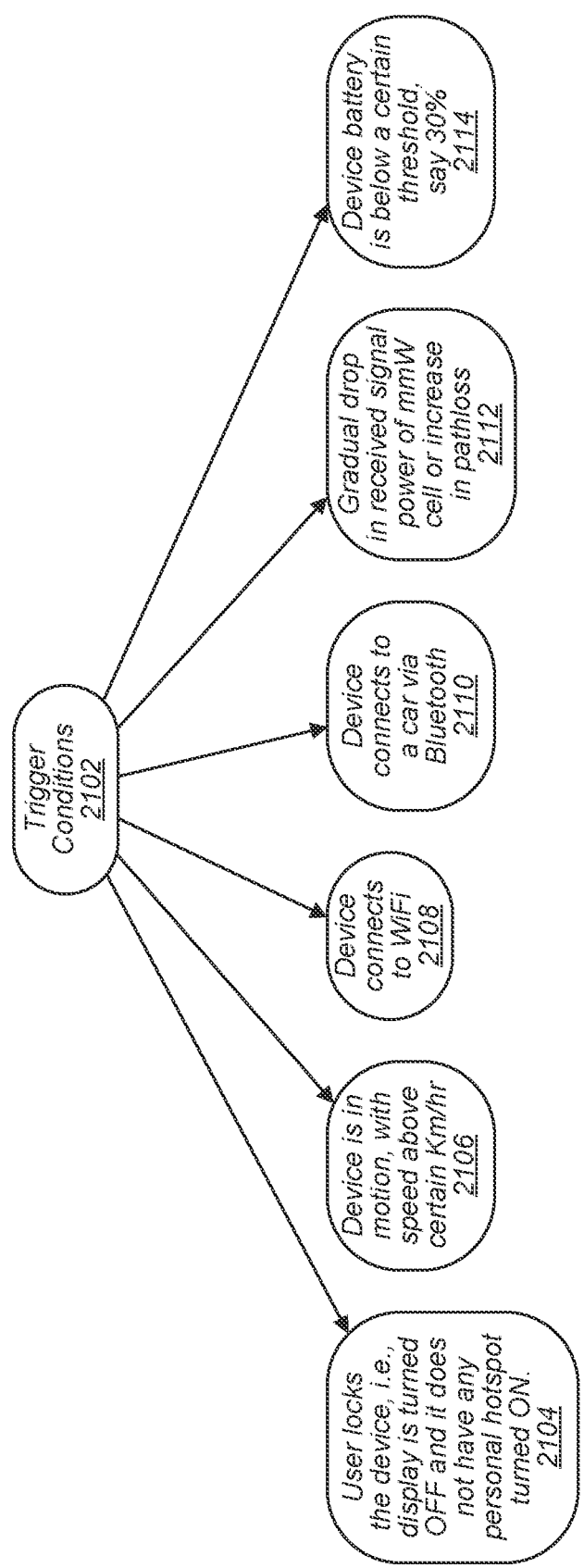
FIG. 21 illustrates a plurality of trigger conditions for initiating a timer to perform a secondary cell group (SCG) failure initiation procedure, according to some embodiments.

If a positive determination is made at step 2406, at step 2410 the UE may determine whether any trigger conditions have been satisfied. If not, the UE continues with normal operations at 2412. A list of trigger conditions is presented in FIG. 21 (2102), which may include a user locking the UE (2104), the UE being in motion with a speed above a predetermined threshold speed (2106) (e.g., a speed corresponding to travel in a vehicle), whether the device is connected to WiFi (2108), whether the device is connected to a vehicle via BlueTooth™ (2110), whether a gradual drop in received signal power of the mmW has been detected, or an increase in pathloss (2112), or whether the device is below a threshold level of remaining battery life (2114).

If a trigger condition is satisfied, the UE may initiate a timer at step 2414. Upon expiration of the timer at step 2416, the UE may perform an SCG failure initiation procedure at step 2418, and may report an SCG failure to the network at step 2420. Steps 2418 and 2420 may serve to detach the UE from the mmW cell, responsive to occurrence of the trigger condition.

At 2422, if the UE detects a reversal of the trigger condition (i.e, if the trigger condition at 2410 was that the UE is locked, a reversal of the trigger condition may include detecting that the UE has been subsequently unlocked), the UE may report LTE-to-NR measurements as configured by the network and continue normal operation at step 2424.

Antenna Switching depending on Traffic

In some embodiments, especially when a UE is engaged in sustained peak throughput of data transmission and/or reception, the UE may monitor the rate of change of the temperature of the UE over time. In these embodiments, if the rate of change of the temperature is greater than a predetermined value, UE may switch to a different antenna module that has a worse signal strength than the best antenna module. This may artificially reduce the data rate, but may help to maintain or reduce the temperature. Additionally or alternatively, the dynamic range of the analog-to-digital converter (ADC) may be adjusted to reduce thermal impact at the cost of degrading performance. Advantageously, these methods may allow the UE to conduct communications over the 5G network for a longer duration of time without overheating.

Specific Absorption Rate (SAR) Backoff

In some embodiment, a UE may be configured to implement a specific absorption rate (SAR) backoff feature, wherein the UE may be configured to detect a grip orientation of the UE and/or detect the proximity of the UE to a user's hand and/or ear. When the UE is sufficiently close to a particular body part of the user (e.g., when the UE is placed against a user's ear), the SAR backoff feature may limit a transmission (Tx) power of the UE for one or more frequency ranges, to prevent excessive radiation exposure to the user and/or to comply with applicable laws and regulations. For example, a UE that supports mmW or higher frequency transmissions may be configured to limit its Tx power for these frequencies in certain user grip conditions, to satisfy SAR limits and/or regulations. SAR limits may be tiered, in some embodiments, where a first reduced Tx power limit is set while the device is being held in hand, and a second (e.g., more strict) Tx power limit is set while the device is held against a user's head. In some embodiments, the more strict Tx power limit may include disabling mmW transmissions entirely. Further, in some embodiments, the Tx limits imposed by SAR regulations may vary depending on frequency. For example, higher frequency transmissions (e.g., above 30 GHz) such as those anticipated to be utilized by 5G NR may be subject to stricter transmission power limits during certain grip orientations than lower frequencies, as the higher frequencies may potentially pose a greater health risk to the user.

The following numbered paragraphs describe additional embodiments.

In some embodiments, a user equipment device (UE) comprises a radio and a processor operably coupled to the radio. The UE is configured to receive, by a baseband processor (BB) of the UE, a notification to initiate communications with a remote device. The UE is further configured to wake an application processor (AP) of the UE from sleep at least in part in response to receiving the notification. The UE is further configured to determine that the communications with the remote device are not associated with a 5th Generation New Radio (5G NR) radio access technology (RAT). Based at least in part on determining that the communications with the remote device are not associated with the 5G NR RAT, the UE is further configured to refrain from performing first measurements associated with the 5G NR RAT.

In some embodiments, the UE is further configured to determine that a temperature of the UE is above a threshold, where the first measurements are not performed further based at least in part on determining that the temperature of the UE is above the threshold, wherein the first measurements comprise millimeter wave (mmWave) frequency measurements. In these embodiments, the UE is further configured to perform second measurements associated with the 5G NR RAT on a sub-6 GHz frequency range.

In some embodiments, a UE is configured to determine whether a level of data transfer to be performed by the UE is below a first threshold, and refrain from performing millimeter wave (mmWave) frequency radio measurements associated with a 5G NR RAT based at least in part on determining that the level of data transfer to be performed by the UE is below the first threshold.

In some embodiments, the UE is further configured to determine that the UE is in a high mobility state, and the first measurements are not performed further based at least in part on determining that the UE is in a high mobility state.

In some embodiments, the UE is further configured to determine that the level of data transfer to be performed by the UE is below a second threshold, where the second threshold is less than the first threshold. In these embodiments, the UE is further configured to refrain from performing sub-6 GHz frequency radio measurements associated with the 5G NR RAT based at least in part on determining that the level of data transfer to be performed by the UE is below the second threshold.

In some embodiments, the UE is further configured to determine that a display of the UE is turned off and refrain from performing sub-6 GHz frequency radio measurements associated with the 5G NR RAT based at least in part on determining that the display of the UE is turned off.

In some embodiments, a UE is configured to establish a connection with a network over a plurality of secondary cells (SCells) associated with a 5G NR RAT, perform signal quality measurements on each of the plurality of SCells, and transmit, to the network, a drop priority list indicating a preference for dropping at least a first SCell of the plurality of SCells, wherein the drop priority list is determined based at least in part on results of the signal quality measurements.

In some embodiments, the drop priority list comprises a ranked ordering of preference for dropping each of the plurality of SCells.

In some embodiments, a UE is configured to establish a connection with a network over a plurality of SCells associated with a 5G NR RAT, wherein the connection utilizes a first bandwidth, determine that a reduced bandwidth condition has occurred; at least in part in response to determining that the reduced bandwidth condition has occurred; transmit updated UE capability information to the network, wherein the updated UE capability information specifies a capability for communicating with the network utilizing a second bandwidth, wherein the second bandwidth is smaller than the first bandwidth; and at least in part in response to transmitting the updated UE capability information to the network, receive, from the network, an indication to remove one or more of the plurality of SCells from the connection.

In some embodiments, the reduced bandwidth condition comprises one or more of a battery level of the UE falling below a battery level threshold, a temperature of the UE rising above a temperature threshold, a block error rate (BLER) associated with the connection rising above a BLER threshold, or a frequency of radio link failures rising above a radio link failure threshold.

In some embodiments, a UE is configured to establish an Evolved Universal Terrestrial Radio Access (EUTRA) New Radio (NR) Dual Connectivity (ENDC) connection with a eNB and one or more gNBs, determine that a temperature of the UE has risen above a temperature threshold, determine whether an active bandwidth part (BWP) used for the ENDC connection is greater than a bandwidth threshold, and based at least in part on determining that the active BWP is greater than the bandwidth threshold, disable the connection with the one or more gNBs and transition the ENDC connection to a standalone connection with the eNB.

In some embodiments the BWP threshold is 20 MHz.

In some embodiments, a UE is configured to establish an ENDC connection with a network through an eNB and a gNB, determine that the eNB is experiencing poor uplink coverage, and based at least in part on determining that the eNB is experiencing poor uplink coverage, transmit a buffer status report (BSR) to the network to move all data traffic associated with the connection to the gNB.

In some embodiments, a UE is configured to establish an ENDC connection with a network through an eNB and a gNB, determine that the gNB is experiencing poor uplink coverage, and based at least in part on determining that the gNB is experiencing poor uplink coverage, transmit a buffer status report (BSR) to the network to move all data traffic associated with the connection to the eNB.

In some embodiments, a UE is configured to establish an ENDC connection with a network through an eNB and a gNB, determine that both the eNB and the gNB are experiencing poor uplink coverage, and based at least in part on determining that the eNB and the gNB are experiencing poor uplink coverage, enable a supplementary uplink (SUL) channel and move all data traffic associated with the connection to the SUL channel.

In some embodiments, a UE is configured to establish an ENDC connection with a network through an eNB and a gNB, initiate a high priority data session with the network over the ENDC connection, determine that a temperature of the UE exceeds a temperature threshold, and at least in part in response to determining that the temperature of the UE exceeds the temperature threshold, disable the connection with the gNB and continue the high priority data session with the eNB.

In some embodiments, disabling the connection with the gNB comprises transmitting an SCGFailureInformation message to the gNB.

In some embodiments, the SCGFailureInformation message does not include a measurement result frequency list information element or a measurement result Secondary Cell Group (SCG) failure information element.

In some embodiments, the UE is further configured to, after disabling the connection with the gNB, refrain from performing cell measurements on the gNB until the high priority data session is completed or the temperature of the UE drops below the temperature threshold.

In some embodiments, a UE is configured to establish a standalone (SA) connection with a network through a gNB, perform an inter-radio access technology (inter-RAT) cell measurement on an eNB, and determine whether the eNB is operating in an overlapping frequency range with the SA connection through the gNB. Based on a determination that the eNB is not operating in the overlapping frequency range, the UE is further configured to disable the connection with the gNB and establish a connection with the eNB.

In some embodiments, the UE is further configured to, based on a determination that the eNB is operating in the overlapping frequency range, determine whether a signal strength of the eNB and a signal strength of the gNB differ by less than a predetermined amount. In these embodiments, based at least in part on determining that the signal strength of the eNB and the signal strength of the gNB differ by less than the predetermined amount, the UE is further configured to continue the SA connection with the network through the gNB and refrain from performing further inter-RAT cell measurements on the eNB for a predetermined period of time.

In some embodiments, the SA connection through the gNB operates within a sub -6 GHz frequency range.

In some embodiments, the SA connection through the gNB operates within a mmWave frequency range.

In some embodiments, a UE is configured to establish a connection with an eNB that supports ENDC, determine that each of a first gNB operating in a sub-6 GHz frequency band and a second gNB operating in a mmWave frequency band are available, and determine a signal strength of each of the first gNB and the second gNB, wherein the signal strength of the second gNB is stronger than the signal strength of the first gNB. Based at least in part on determining that the signal strength of the first gNB is within a predetermined decibel range of the signal strength of the second gNB, the UE is further configured to establish an ENDC connection with the eNB and the first gNB.

In some embodiments, the UE is further configured to, based at least in part on determining that the signal strength of the first gNB is not within the predetermined decibel range of the signal strength of the second gNB, establish an ENDC connection with the eNB and the second gNB.

In some embodiments, establishing the ENDC connection with the eNB and the first gNB is performed further based at least in part on determining that a remaining battery level of the UE is below a predetermined threshold.

In some embodiments, establishing the ENDC connection with the eNB and the first gNB is performed further based at least in part on determining that a display of the UE is turned off In some embodiments, the connection with the eNB is in a radio resource control (RRC) idle or connected state.

In some embodiments, the UE is further configured to determine that the UE is serving as a wireless local area network (WLAN) hotspot, and based at least in part on determining that the UE is serving as the WLAN hotspot, establish the ENDC connection with the eNB and the second gNB instead of with the eNB and the first gNB.

In some embodiments, the UE is further configured to initiate a timer upon establishing the ENDC connection with the eNB and the first gNB, and upon expiration of the timer, establish an ENDC connection with the eNB and the second gNB.

In some embodiments, the UE is further configured to determine that an application has initiated on the UE that utilizes high data throughput, and at least in part in response to determining that the application has initiated on the UE that utilizes high data throughput, establish an ENDC connection with the eNB and the second gNB for performing the high data throughput.

In some embodiments, a UE is configured to perform wireless communications with a network through a gNB using a mmWave frequency band, determine that the UE is within a first predetermined range of a user, and based at least in part on determining that the UE is within the first predetermined range of the user, throttle the wireless communications with the network using the mmWave frequency band.

In some embodiments, determining that the UE is within the first predetermined range of the user comprises one or more of utilizing a face identification function of the UE to determine a distance to the face of the user or utilizing a grip detection function of the UE to determine whether the user is currently holding the UE.

In some embodiments, the UE is further configured to determine that the UE is within a second predetermined range of the user, wherein the second predetermined range is smaller than the first predetermined range, and based at least in part on determining that the UE is within the second predetermined range of the user, disable the wireless communications with the network using the mmWave frequency band.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

In some embodiments, a network device (e.g., a BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The network device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising, by a user equipment (UE) device:
- establishing an Evolved Universal Terrestrial Radio Access (EUTRA) New Radio (NR) Dual Connectivity (ENDC) connection with a network, wherein the ENDC connection comprises a connection involving an evolved node B (eNB) and a gNodeB (gNB);
- initiating a data session with the network over the ENDC connection;
- determining that the UE device satisfies an overheating condition; and
- indicating, at least in part based on determining that the UE device satisfies the overheating condition, a preference to drop one or more cells associated with the ENDC connection that correspond to the gNB and to continue the data session using the eNB;
- wherein indicating the preference to drop one or more cells associated with the ENDC connection that correspond to the gNB comprises transmitting a drop priority list to the network;
- wherein the drop priority list comprises a ranked ordering of preference for dropping a plurality of secondary cells (SCells) of the gNB.

2. The method of claim 1, further comprising: performing signal quality measurements on each of a plurality of secondary cells (SCells) of the gNB, wherein the drop priority list is determined based at least in part on the signal quality measurements.

3. The method of claim 1,
- wherein indicating the preference to drop the one or more cells associated with the ENDC connection that correspond to the gNB comprises indicating a single cell identifier (ID) of a secondary cell (SCell) of the gNB that the UE device prefers to drop.

4. The method of claim 1,
- wherein the eNB comprises a primary cell (PCell), and
- wherein the one or more cells associated with the ENDC connection that correspond to the gNB comprise secondary cells (SCells).

5. The method of claim 1, further comprising:
- refraining from performing cell measurements associated with the gNB until the data session is completed or the UE device no longer satisfies the overheating condition.

6. A user equipment (UE) device, comprising:
- a radio; and
- a processor operably coupled to the radio, wherein the UE device is configured to:
  - establish an Evolved Universal Terrestrial Radio Access (EUTRA) New Radio (NR) Dual Connectivity (ENDC) connection with a network, wherein the ENDC connection comprises a connection involving an evolved node B (eNB) and a gNodeB (gNB);
  - initiate a data session with the network over the ENDC connection;
  - determine that the UE device satisfies an overheating condition; and
  - indicate, at least in part based on determining that the UE device satisfies the overheating condition, a preference to drop one or more cells associated with the ENDC connection that correspond to the gNB and to continue the data session using the eNB;
  - wherein indicating the preference to drop one or more cells associated with the ENDC connection that correspond to the gNB comprises transmitting a drop priority list to the network.
- wherein the drop priority list comprises a ranked ordering of preference for dropping a plurality of secondary cells (SCells) of the gNB.

7. The UE device of claim 6, wherein the UE device is further configured to: perform signal quality measurements on each of a plurality of secondary cells (SCells) of the gNB, wherein the drop priority list is determined based at least in part on the signal quality measurements.

8. The UE device of claim 6,
- wherein indicating the preference to drop the one or more cells associated with the ENDC connection that correspond to the gNB comprises indicating a single cell identifier (ID) of a secondary cell (SCell) of the gNB that the UE device prefers to drop.

9. The UE device of claim 6,
- wherein the eNB comprises a primary cell (PCell), and
- wherein the one or more cells associated with the ENDC connection that correspond to the gNB comprise secondary cells (SCells).

10. The UE device of claim 6, wherein the UE device is further configured to:
- refrain from performing cell measurements associated with the gNB until the data session is completed or the UE device does not satisfy the overheating condition.

11. A baseband processor configured to cause a user equipment (UE) device to:
- establish an Evolved Universal Terrestrial Radio Access (EUTRA) New Radio (NR) Dual Connectivity (ENDC) connection with a network, wherein the ENDC connection comprises a connection with an evolved node B (eNB) and a gNodeB (gNB);
- initiate a data session with the network over the ENDC connection;
- determine that the UE device satisfies an overheating condition; and
- indicate, at least in part based on determining that the UE device satisfies the overheating condition, a preference to drop one or more cells associated with the ENDC connection that correspond to the gNB and to continue the data session using the eNB;
- wherein indicating the preference to drop one or more cells associated with the ENDC connection that correspond to the gNB comprises transmitting a drop priority list to the network;
- wherein the drop priority list comprises a ranked ordering of preference for dropping a plurality of secondary cells (SCells) of the gNB.

12. The baseband processor of claim 11, wherein the baseband processor is further configured to cause the UE device to: perform signal quality measurements on each of a plurality of secondary cells (SCells) of the gNB, wherein the drop priority list is determined based at least in part on the signal quality measurements.

13. The baseband processor of claim 11,
- wherein indicating the preference to drop the one or more cells associated with the ENDC connection that correspond to the gNB comprises indicating a single cell identifier (ID) of a secondary cell (SCell) of the gNB that the UE device prefers to drop.

14. The baseband processor of claim 11,
- wherein the eNB comprises a primary cell (PCell), and
- wherein the one or more cells associated with the ENDC connection that correspond to the gNB comprise secondary cells (SCells).

* * * * *